(12) United States Patent
Wang et al.

(10) Patent No.: US 11,996,894 B2
(45) Date of Patent: May 28, 2024

(54) MODULATION METHOD, APPARATUS, AND SYSTEM FOR IMAGING SCANNING SIGNAL SYNCHRONIZATION

(71) Applicant: MECH-MIND ROBOTICS TECHNOLOGIES LTD., Beijing (CN)

(72) Inventors: Ting Wang, Beijing (CN); Yu Guo, Beijing (CN); Xiangru Wang, Beijing (CN); Youshuang Ding, Beijing (CN); Tianlan Shao, Beijing (CN)

(73) Assignee: MECH-MIND ROBOTICS TECHNOLOGIES LTD., Beijing (CN)

( * ) Notice: Subject to any disclaimer, the term of this patent is extended or adjusted under 35 U.S.C. 154(b) by 51 days.

(21) Appl. No.: 17/584,912

(22) Filed: Jan. 26, 2022

(65) Prior Publication Data

US 2022/0149951 A1    May 12, 2022

Related U.S. Application Data

(63) Continuation of application No. PCT/CN2020/115309, filed on Sep. 15, 2020.

(30) Foreign Application Priority Data

Sep. 11, 2020   (CN) .......................... 202010954762.0

(51) Int. Cl.
*H04B 10/556* (2013.01)
*H04B 10/50* (2013.01)
*H04B 10/69* (2013.01)

(52) U.S. Cl.
CPC ....... *H04B 10/5563* (2013.01); *H04B 10/503* (2013.01); *H04B 10/697* (2013.01)

(58) Field of Classification Search
CPC . H04B 10/5563; H04B 10/503; H04B 10/697
(Continued)

(56) References Cited

U.S. PATENT DOCUMENTS

| 5,848,188 A | 12/1998 | Shibata et al. |
| 6,529,758 B2 * | 3/2003 | Shahidi ................. A61B 5/064 600/407 |

(Continued)

FOREIGN PATENT DOCUMENTS

| CN | 105611193 A | 5/2016 |
| CN | 106679608 A | 5/2017 |

(Continued)

OTHER PUBLICATIONS

Li et al; Development of an In-Situ Laser Machining System Using a Three-Dimensional Galvanometer Scanner; 2020; Science direct; pp. 1-9. (Year: 2020).*

(Continued)

*Primary Examiner* — Amritbir K Sandhu
(74) *Attorney, Agent, or Firm* — Scully, Scott, Murphy & Presser, P.C.

(57) ABSTRACT

The present disclosure provides a modulation method, apparatus, and system for imaging scanning signal synchronization. The method includes: transmitting control signals, wherein the control signals include a galvanometer driving signal, a laser scanning signal, and a camera exposure signal, the galvanometer driving signal and the camera exposure signal have a same period, and the laser scanning signal enables laser to be emitted for N times within time for enabling positive oscillation of a galvanometer in one period of the galvanometer driving signal; measuring an actual signal waveform of the galvanometer, and obtaining a noise-reduced waveform by filtering and de-noising the actual signal waveform; performing a waveform comparison detection on the noise-reduced waveform and a corresponding control waveform for the galvanometer driving signal to obtain a waveform deviation; and adjusting the control
(Continued)

signals based on the waveform deviation and transmitting the adjusted control signals.

13 Claims, 10 Drawing Sheets

(58) Field of Classification Search
USPC .......................................................... 398/187
See application file for complete search history.

(56) References Cited

U.S. PATENT DOCUMENTS

| 11,443,529 | B2* | 9/2022 | Schaefer | G01S 17/931 |
|---|---|---|---|---|
| 2007/0035799 | A1 | 2/2007 | Gomi et al. | |
| 2009/0147336 | A1* | 6/2009 | Suzuki | G02B 26/105 |
| | | | | 359/199.1 |
| 2015/0176977 | A1 | 6/2015 | Abele et al. | |
| 2016/0216511 | A1 | 7/2016 | Hamou et al. | |
| 2018/0031824 | A1* | 2/2018 | Wang | B23K 26/082 |
| 2023/0191490 | A1* | 6/2023 | Buller | B33Y 50/02 |
| | | | | 419/1 |
| 2023/0273417 | A1* | 8/2023 | Cui | G02B 21/008 |
| | | | | 250/458.1 |

FOREIGN PATENT DOCUMENTS

| CN | 108072972 | A | 5/2018 |
|---|---|---|---|
| CN | 108387176 | A | 8/2018 |
| CN | 109782264 | A | 5/2019 |
| CN | 109788264 | A | 5/2019 |
| CN | 110726383 | A | 1/2020 |
| CN | 110749894 | A | 2/2020 |
| CN | 111289955 | A | 6/2020 |
| CN | 111307303 | A | 6/2020 |
| CN | 210776029 | U | 6/2020 |
| CN | 111487762 | A | 8/2020 |
| JP | H11281322 | A | 10/1999 |
| JP | 2005252484 | A | 9/2005 |
| JP | 2011197179 | A | 10/2011 |
| JP | 111289955 | A | 6/2020 |
| WO | 2012032740 | A1 | 3/2012 |
| WO | 2018066868 | A1 | 4/2018 |

OTHER PUBLICATIONS

First Office Action dated Feb. 28, 2023 received in Chinese Patent Application No. CN 202110710216.7.
First Office Action dated Apr. 28, 2023 received in Chinese Patent Application No. CN 202110711622.5.
Notice of Decision of Granting Patent Right for Invention dated Jun. 8, 2023 received in Chinese Patent Application No. CN 202110710216.7.
First Office Action and First Search dated Apr. 6, 2021 issued in CN 202010954762.0.
Notification to Grant Patent Right for Invention dated Jul. 19, 2021 issued in CN 202010954762.0.
Supplementary Search Report dated Jun. 24, 2021 issued in CN 202010954762.0.

* cited by examiner

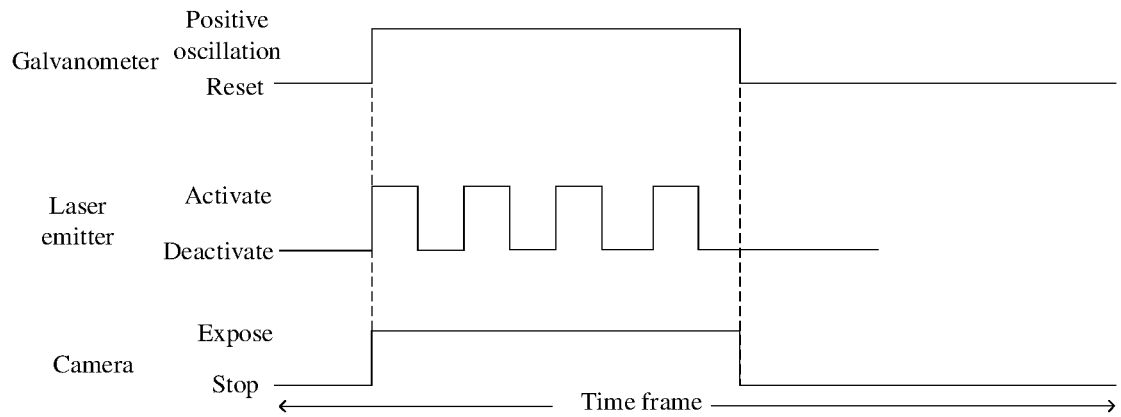

FIG. 1

```
┌─────────────────────────────────────────────────────────────────────┐
│ Transmitting control signals, wherein the control signals comprise a galvanometer │
│   driving signal, a laser scanning signal, and a camera exposure signal, the      │
│  galvanometer driving signal and the camera exposure signal have a same period,   │
│  and the laser scanning signal enables laser to be emitted for N times within time│
│         for enabling positive oscillation of a galvanometer in one period of the  │
│                          galvanometer driving signal                              │
└─────────────────────────────────────────────────────────────────────┘
                                                                         S201

┌─────────────────────────────────────────────────────────────────────┐
│ Measuring an actual signal waveform of the galvanometer, and obtaining a noise-   │
│    reduced waveform by filtering and de-noising the actual signal waveform        │
└─────────────────────────────────────────────────────────────────────┘
                                                                         S202

┌─────────────────────────────────────────────────────────────────────┐
│ Performing a waveform comparison detection on the noise-reduced waveform and      │
│ a corresponding control waveform for the galvanometer driving signal to obtain a  │
│                              waveform deviation                                   │
└─────────────────────────────────────────────────────────────────────┘
                                                                         S203

┌─────────────────────────────────────────────────────────────────────┐
│  Adjusting the control signals based on the waveform deviation and transmitting   │
│                         the adjusted control signals                              │
└─────────────────────────────────────────────────────────────────────┘
                                                                         S204
```

FIG. 2

MODULATION METHOD, APPARATUS, AND SYSTEM FOR IMAGING SCANNING SIGNAL SYNCHRONIZATION

CROSS-REFERENCE TO RELATED APPLICATIONS

The present application is a continuation of International Application No. PCT/CN2020/115309, filed on Sep. 15, 2020, which claims priority to Chinese Patent Application No. 202010954762.0, titled "MODULATION METHOD, APPARATUS, AND SYSTEM FOR IMAGING SCANNING SIGNAL SYNCHRONIZATION", and filed on Sep. 11, 2020, the entire disclosures of which are incorporated herein by their references.

FIELD

The present disclosure relates to the field of 3D imaging technologies, and more particularly, to a modulation method, a modulation apparatus, and a modulation system for imaging scanning signal synchronization, and a depth image acquisition method and apparatus based on a modulation method for imaging scanning signal synchronization.

BACKGROUND

In the field of 3D imaging, on one hand, in order to obtain some scene fringe images required for imaging fusion, it is necessary to shoot, through the camera, application scene images having projected fringe structured light; on the other hand, because laser has high brightness characteristics and is not susceptible to interference from ambient light, structured light in the form of laser scanning can present clearer fringes than other forms of light. Therefore, in general, an acquisition system for 3D imaging includes a laser device for emitting laser, a galvanometer for refracting the laser to implement a scanning function so that the laser is projected in a shape of fringes into a scene, and a camera for capturing a fringe image of the scene. The specific working process of the system includes the followings. The galvanometer is driven by a signal to periodically deflect and oscillate along the long axis of the lens, the laser device cooperates with the periodic oscillation of the galvanometer and is periodically activated and deactivated. Specifically, the laser device is activated to emit laser when the galvanometer is deflected to some angle intervals, and stops emission at the remaining angle intervals of the galvanometer. In this way, light and dark fringes are projected in corresponding areas of scenes corresponding to the angle intervals, and meanwhile, the camera is driven periodically to expose and photograph in cooperation with the oscillation of the galvanometer, so that a scene fringe diagram is obtained, and a plurality of fringe images can be obtained by repeating the process for subsequent use. In the process, a galvanometer driving signal, a laser scanning signal, and a camera exposure signal are required to be synchronous strictly, and the digital signal waveform for specific synchronization requirements is shown in FIG. 1, so that a clear and accurate fringe diagram can be obtained.

However, in practice, due to the problems of the response speed of the galvanometer itself, the wear of hardware in the use process and the like, the actual oscillation condition of the galvanometer cannot completely match the theoretical value in FIG. 1, and further, the obtained scene fringe diagram deviates from the theory.

For the deviation, in the related art, an accurate scene fringe diagram is artificially synthesized in advance, then the galvanometer, the laser device and the camera are driven to obtain an actual scene fringe diagram, the two diagrams are subjected to gray processing and then subjected to comparison for difference through an image recognition algorithm to obtain pixel value deviation, based on which the galvanometer driving signal is adjusted. Although the technology can solve the problem of inaccurate fringe diagram to a certain extent, the technology needs to synthesize the scene fringe diagram in advance before use and shoot the actual fringe diagram in advance for comparison operation, and the process is complex and has low intelligence degree.

SUMMARY

The present disclosure aims to solve at least one of the technical problems in the related art.

To this end, an embodiment of the present disclosure provides a modulation method for imaging scanning signal synchronization, including transmitting control signals, wherein the control signals include a galvanometer driving signal, a laser scanning signal, and a camera exposure signal, the galvanometer driving signal and the camera exposure signal have a same period, and the laser scanning signal enables laser to be emitted for N times within time for enabling positive oscillation of a galvanometer in one period of the galvanometer driving signal; measuring an actual signal waveform of the galvanometer, and obtaining a noise-reduced waveform by filtering and de-noising the actual signal waveform; performing a waveform comparison detection on the noise-reduced waveform and a corresponding control waveform for the galvanometer driving signal to obtain a waveform deviation; and adjusting the control signals based on the waveform deviation and transmitting the adjusted control signals.

Optionally, said performing the waveform comparison detection on the noise-reduced waveform and the corresponding control waveform corresponding to the galvanometer driving signal to obtain the waveform deviation includes: comparing the noise-reduced waveform with the control waveform to determine a phase deviation, wherein the waveform deviation includes the phase deviation.

Optionally, the noise-reduced waveform reflects an actual phase in time of oscillation of a lens of the galvanometer, the control waveform reflects a theoretical phase in time of the oscillation of the lens of the galvanometer, and a time gap required for the lens of the galvanometer to deflect from the actual phase to the theoretical phase is determined based on the phase deviation; said adjusting the control signals based on the waveform deviation includes: transmitting the galvanometer driving signal at a first moment, and transmitting the laser scanning signal and the camera exposure signal at a second moment; and the first moment differs from the second moment by the time gap.

Optionally, the waveform deviation further includes a distinct waveform segment of the noise-reduced waveform, the distinct waveform segment being different from the control waveform in terms of waveform smoothness; and said adjusting the control signals based on the waveform deviation includes: determining a time interval required for the noise-reduced waveform to pass through the distinct waveform segment; and adjusting, based on the phase deviation and the time interval, a moment at which the control signals are transmitted.

Optionally, said adjusting the control signals based on the waveform deviation includes: determining a distinct waveform segment, the waveform deviation including the distinct waveform segment; determining, based on the distinct waveform segment, a wave value corresponding to a moment at which a waveform smoothness of the noise-reduced waveform is consistent with a waveform smoothness of the control waveform; and determining a transmission enabling signal based on the wave value, wherein the transmission enabling signal controls transmission of the laser scanning signal and the camera exposure signal.

Optionally, the actual signal waveform is any one of a voltage waveform, a current waveform, a deflection angle waveform, or a reference point displacement waveform of the galvanometer; and the control waveform and the actual signal waveform are of a same type.

In a second aspect, an embodiment of the present disclosure further provides a depth image acquisition method based on a modulation method for imaging scanning signal synchronization, including: determining first signals, wherein the first signals include a first galvanometer driving signal, a first laser scanning signal, and a first camera exposure signal; the first galvanometer driving signal and the first camera exposure signal have a same period T1, and the first laser scanning signal enables a laser emitter to be activated for one time or $2^k$ times within respective time for enabling positive oscillation of a galvanometer during each of n periods T1, where n and k are positive integers, and $0<k<n-1$; determining the first signals corresponding to the n periods T1 as transmission control signals respectively, and performing adjustment on the transmission control signals based on the modulation method for imaging scanning signal synchronization, for transmission to obtain a fringe frequency transformation diagram group; determining second signals, wherein the second signals include a second galvanometer driving signal, a second laser scanning signal, and a second camera exposure signal; the second galvanometer driving signal and the second camera exposure signal have a same period T2, the second laser scanning signal enables the laser emitter to be activated for $2^k$ times within respective time for enabling positive oscillation of the galvanometer in each period of m periods T2, and the m periods T2 includes one period T2 in which relative positions of an activation moment and a deactivation moment for each time of the $2^k$ times the laser emitter is activated are identical to relative positions of an activation moment and a deactivation moment for each time of the $2^k$ times the laser emitter is activated within the period T1; and the second laser scanning signal has a phase difference of a predetermined value between every two adjacent periods of the m periods T2, where m is a positive integer; determining the second signals corresponding to the m periods T2 as transmission control signals respectively, and performing adjustment on the transmission control signals based on the modulation method for imaging scanning signal synchronization, for transmission to obtain a fringe position movement diagram group; and calculating a depth image based on the fringe frequency transformation diagram group and the fringe position movement diagram group.

Optionally, the period T2 is shorter than the period T1, and the method further includes: determining third signals, wherein the third signals include the second galvanometer driving signal, a third laser scanning signal, and a third camera exposure signal; the third laser scanning signal includes m second laser scanning signal periods and m sine fringe correction periods corresponding to the m second laser scanning signal periods; each of the m sine fringe correction periods includes h correction sub-periods, and a number of times the laser emitter is activated in any correction sub-period within time for enabling positive oscillation of the galvanometer in the period T2 and a number of times the laser emitter is activated within a second laser scanning signal period corresponding to the correction sub-period are both $2^k$; a activated duration in any correction sub-period in any sine fringe correction period is shortened compared with an activated duration in a second laser scanning signal period corresponding to the correction sub-period, and a range in the period T2 occupied by the activated duration in the correction sub-period is within a range in the period T2 occupied by the activated duration in the second laser scanning signal period corresponding to the correction sub-period; for a same sine fringe correction period, the activated duration is shortened differently for the h correction sub-periods; a period T3 of the third camera exposure signal is (h×m) periods T2, wherein the activated duration is a time span from a certain activation moment of the laser emitter to a first deactivation moment subsequent to the activation moment; and determining the third signals as transmission control signals, and performing adjustment on the transmission control signals based on the modulation method for imaging scanning signal synchronization, for transmission to obtain a sine wave fringe diagram; and said calculating the depth image based on the fringe frequency transformation diagram group and the fringe position movement diagram group includes: calculating the depth image based on the fringe frequency transformation diagram group, the fringe position movement diagram group, and the sine wave fringe image.

In a third aspect, an embodiment of the present disclosure further provides an modulation apparatus for imaging scanning signal synchronization, including: a signal generating module configured to generate and transmit control signals, wherein the control signals include a galvanometer driving signal, a laser scanning signal, and a camera exposure signal, the galvanometer driving signal and the camera exposure signal have a same period, and the laser scanning signal enables laser to be emitted for N times within time for enabling positive oscillation of a galvanometer in one period of the galvanometer driving signal; a waveform acquisition module configured to measure an actual signal waveform of the galvanometer, obtain a noise-reduced waveform by filtering and de-noising the actual signal waveform, and transmit the noise-reduced waveform to a waveform detection module; and the waveform detection module configured to perform a waveform comparison detection on the noise-reduced waveform and a corresponding control waveform for the galvanometer driving signal to obtain a waveform deviation, and transmit the waveform deviation to the signal generating module; and the signal generating module is further configured to adjust the control signals based on the waveform deviation and transmit the adjusted control signals.

Optionally, the waveform detection module is further configured to compare the noise-reduced waveform with the control waveform to determine a phase deviation, and the waveform deviation includes the phase deviation.

Optionally, the noise-reduced waveform reflects an actual phase in time of oscillation of a lens of the galvanometer, the control waveform reflects a theoretical phase in time of the oscillation of the lens of the galvanometer, and a time gap required for the lens of the galvanometer to deflect from the actual phase to the theoretical phase is determined based on the phase deviation; the signal generating module is further configured to transmit the galvanometer driving signal at a first moment, and transmit the laser scanning signal and the camera exposure signal at a second moment, where the first moment differs from the second moment by the time gap.

Optionally, the waveform deviation further includes a distinct waveform segment of the noise-reduced waveform, the distinct waveform segment being different from the control waveform in terms of waveform smoothness; the signal generating module includes: a first determining sub-module configured to determine a time interval required for the noise-reduced waveform to pass through the distinct waveform section; and an adjusting sub-module configured to adjust, based on the phase deviation and the time interval, a moment at which the control signals are transmitted.

Optionally, the signal generating module includes: a second determining sub-module configured to determine a distinct waveform segment, the waveform deviation including the distinct waveform segment; a third determining sub-module configured to determine, based on the distinct waveform segment, a wave value corresponding to a moment at which a waveform smoothness of the noise-reduced waveform is consistent with a waveform smoothness of the control waveform; and a transmitting sub-module configured to determine a transmission enabling signal based on the wave value, where the transmission enabling signal controls transmission of the laser scanning signal and the camera exposure signal.

Optionally, the actual signal waveform is any one of a voltage waveform, a current waveform, a deflection angle waveform, or a reference point displacement waveform of the galvanometer; and the control waveform and the actual signal waveform are of a same type.

In a fourth aspect, an embodiment of the present disclosure further provides a depth image acquisition apparatus based on a modulation method for imaging scanning signal synchronization. The depth image acquisition apparatus includes a first determining module configured to determine first signals, wherein the first signals include a first galvanometer driving signal, a first laser scanning signal, and a first camera exposure signal; the first galvanometer driving signal and the first camera exposure signal have a same period T1, and the first laser scanning signal enables a laser emitter to be activated for one time or $2^k$ times within respective time for enabling positive oscillation of a galvanometer during each of n periods T1, where n and k are positive integers, and $0<k<n-1$; a first synchronization module configured to determine the first signals corresponding to the n periods T1 as transmission control signals respectively, and perform adjustment on the transmission control signals based on the modulation method for imaging scanning signal synchronization, for transmission to obtain a fringe frequency transformation diagram group; a second determining module configured to determine second signals, wherein the second signals include a second galvanometer driving signal, a second laser scanning signal, and a second camera exposure signal; the second galvanometer driving signal and the second camera exposure signal have a same period T2, the second laser scanning signal enables the laser emitter to be activated for $2^k$ times within respective time for enabling positive oscillation of the galvanometer in each period of m periods T2, and the m periods T2 includes one period T2 in which relative positions of an activation moment and a deactivation moment for each time of the $2^k$ times the laser emitter is activated are identical to relative positions of an activation moment and a deactivation moment for each time of the $2^k$ times the laser emitter is activated within the period T1; and the second laser scanning signal has a phase difference of a predetermined value between every two adjacent periods of the m periods T2, where m is a positive integer; a second synchronization module configured to determine the second signals corresponding to the m periods T2 as transmission control signals respectively, and perform adjustment on the transmission control signals based on the modulation method for imaging scanning signal synchronization, for transmission to obtain a fringe position movement diagram group; and a fusion module configured to calculate a depth image based on the fringe frequency transformation diagram group and the fringe position movement diagram group.

Optionally, the period T2 is shorter than the period T1; the depth image acquisition apparatus further includes: a third determining module configured to determining third signals, wherein the third signals include the second galvanometer driving signal, a third laser scanning signal, and a third camera exposure signal; the third laser scanning signal includes m second laser scanning signal periods and m sine fringe correction periods corresponding to the m second laser scanning signal periods; each of the m sine fringe correction period includes h correction sub-periods, and a number of times the laser emitter is activated in any correction sub-period within time for enabling positive oscillation of the galvanometer in the period T2 and a number of times the laser emitter is activated within a second laser scanning signal period corresponding to the correction sub-period are both $2^k$; an activated duration in any correction sub-period in any sine fringe correction period is shortened compared with an activated duration in a second laser scanning signal period corresponding to the correction sub-period, and a range in the period T2 occupied by the activated duration in the correction sub-period is within a range in the period T2 occupied by the activated duration in the second laser scanning signal period corresponding to the correction sub-period; for a same sine fringe correction time period, the activated duration is shortened differently for the h correction sub-periods; a period T3 of the third camera exposure signal is (h×m) periods T2, wherein the activated duration is a time span from a certain activation moment of the laser emitter to a first deactivation moment subsequent to the activation moment; and a third synchronization module configured to determine the third signals as transmission control signals, and perform adjustment on the transmission control signals based on the modulation method for imaging scanning signal synchronization, for transmission to obtain a sine wave fringe diagram; and the fusion module is further configured to calculate the depth image based on the fringe frequency transformation diagram group, the fringe position movement diagram group, and the sine wave fringe image.

In a fifth aspect, an embodiment of the present disclosure further provides a modulation system for imaging scanning signal synchronization, including: a signal generator; an industrial camera, a laser emitter, and a galvanometer that are respectively in communication connection with the signal generator; a sensor module in communication connection with the galvanometer; and a graphics processor in communication connection with the signal generator and the sensor module respectively, the signal generator is configured to transmit control signals to the industrial camera, the laser emitter, and the galvanometer, and simultaneously transmit the control signals to the graphics processor; the sensor module is configured to collect an actual signal waveform capable of reflecting an actual state of the galvanometer, output a noise-reduced waveform and transmit the noise-reduced waveform to the graphics processor; and the graphics processor is configured to perform detection comparison on the actual signal waveform and a galvanometer driving signal for the galvanometer in the control signals, and transmit a result of the detection comparison to the signal generator to adjust the control signals.

According to the modulation method, apparatus, and system for imaging scanning signal synchronization, the control signals including the galvanometer driving signal, the laser scanning signal, and the camera exposure signal are transmitted, the actual oscillation state of the galvanometer controlled by the galvanometer driving signal is detected, and the transmitted control signals are adjusted based on the actual oscillation state of the galvanometer, so that the synchronization purpose that galvanometer oscillation is accurately matched with laser scanning and accurately matched with camera exposure is achieved, and further, a more accurate fringe diagram is obtained in a simple and intelligent manner compared with the result obtained by the related art.

According to the depth image acquisition method and apparatus based on the modulation method for imaging scanning signal synchronization, signals in the imaging scanning process are modulated based on the modulation method for imaging scanning signal synchronization, then a fringe frequency transformation diagram group is obtained by using T1 as a period, a fringe position movement diagram group is obtained by using T2 as a period, and then the depth image is calculated based on the fringe frequency transformation diagram group and the fringe position movement diagram group. In the process of obtaining the fringe diagrams, the transmitted signals are modulated based on the modulation method for imaging scanning signal synchronization, the actual fringes obtained according to the embodiments of the present disclosure have no deviation from the theoretical condition, and therefore, in the process of obtaining the depth image based on the fringe diagram, the method according to the embodiments of the present disclosure does not need to consider the problem of the deviation of the fringe diagram. Compared with the related art, the method provided in the embodiments of the present disclosure reduces the amount of calculation in the imaging process while ensuring that contour states of objects in a scene containing both highly reflective objects and less reflective objects are clear and positions of the objects are accurate.

BRIEF DESCRIPTION OF DRAWINGS

The above and/or additional aspects and advantages of the present disclosure will become apparent and readily appreciated from the following description of the embodiments in conjunction with the accompanying drawings, in which:

FIG. 1 is a schematic diagram of synchronous states of driving signals of a galvanometer, a laser emitter, and a camera for 3D scanning imaging;

FIG. 2 is a schematic flowchart of a modulation method for imaging scanning signal synchronization according to an embodiment of the present disclosure;

DESCRIPTION OF EMBODIMENTS

Figure 3A:
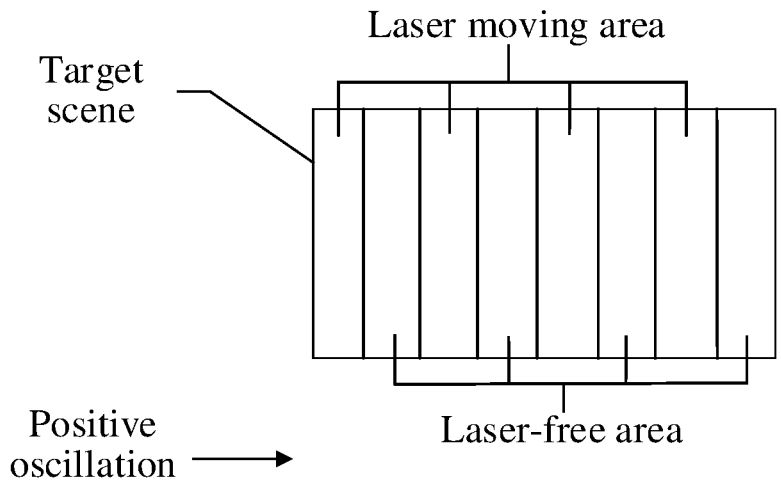
FIG. 3a and FIG. 3b are illustrative diagrams of laser being refracted by a galvanometer to a target scene to produce fringes.

Embodiments of the present disclosure will be described in detail below, and examples of the embodiments are illustrated in the accompanying drawings, throughout which same or similar reference numerals refer to the same or similar elements or elements having the same or similar functions. The embodiments described below with reference to the accompanying drawings are illustrative and intended to explain the present disclosure and should not be construed as limiting the present disclosure.

The embodiment of the present disclosure provides a modulation method for imaging scanning signal synchronization, which is applied in a synchronization modulation apparatus corresponding to the method. Specifically, the synchronization modulation apparatus is a virtual apparatus and is embodied by a computer processing program logic used on a hardware device, and the relevant logic can be implemented based on a hardware device called a synchronization modulation system. In the following, the embodiments will be described with reference to the drawings.

In a first aspect, as illustrated in FIG. 2, the present disclosure provides a modulation method for imaging scanning signal synchronization, including the following steps.

At S201, control signals are transmitted, where the control signals include a galvanometer driving signal, a laser scanning signal, and a camera exposure signal, the galvanometer driving signal and the camera exposure signal have a same period, and the laser scanning signal enables laser to be emitted for N times within time for enabling positive oscillation of a galvanometer in one period of the galvanometer driving signal.

At S202, an actual signal waveform of the galvanometer is measured, and a noise-reduced waveform is obtained by filtering and de-noising the actual signal waveform.

At S203, a waveform comparison detection is performed on the noise-reduced waveform and a corresponding control waveform for the galvanometer driving signal to obtain a waveform deviation.

At S204, the control signals are adjusted based on the waveform deviation, and the adjusted control signals are transmitted.

Figure 3B:
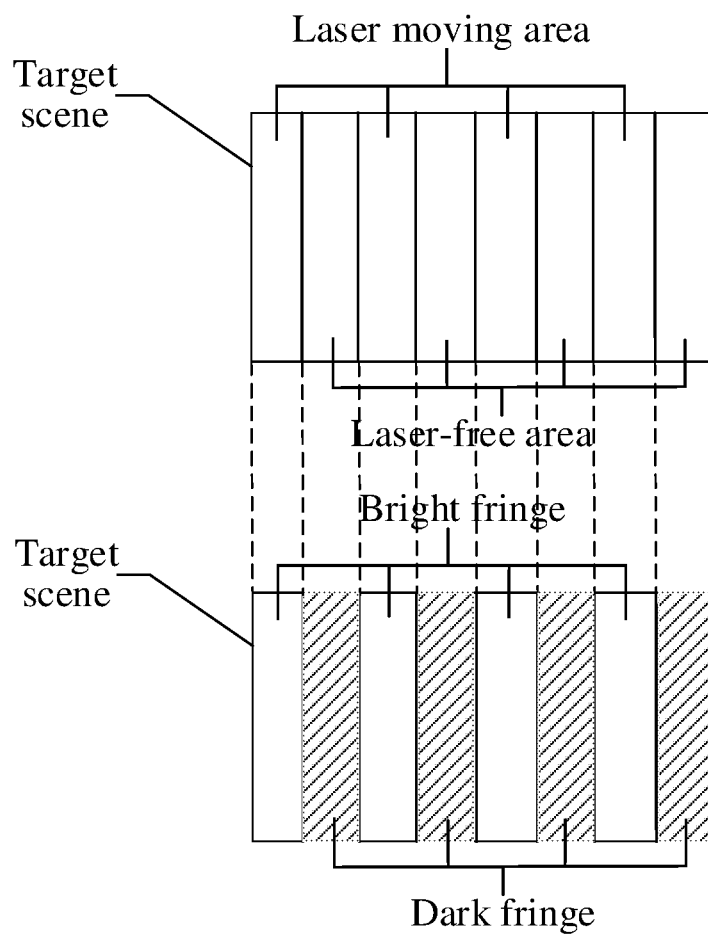

It can be understood by those skilled in the art that the control signals in some embodiments are generic terms of the respective signals for controlling the galvanometer, the laser emitter and the industrial camera respectively. The galvanometer driving signal in the control signals is configured to drive the oscillation of the galvanometer, when the galvanometer receives the galvanometer driving signal, the lens of the galvanometer can deflect by a certain angle clockwise (or counterclockwise) by taking a long axis of the lens as a rotating axis under the driving of a motor of the galvanometer, and the lens of the galvanometer rotates back and is reset when reaching a deflection limit (the back-rotating and resetting process is due to a mechanical action of the galvanometer itself, and does not require driving by a signal), and the oscillation of the galvanometer is periodically repeated in accordance with the period of the galvanometer driving signal. In some cases, a direction in which the galvanometer oscillates clockwise is set as a positive direction, and in other cases, a direction in which the galvanometer oscillates counterclockwise is set as the positive direction. The laser scanning signal is configured to control an activation/deactivation of the laser emitter. Under an activated state of the laser emitter, linear laser emitted by the laser emitter is reflected by the galvanometer to a target scene, and the reflected linear laser presents moving lines in the target scene due to the oscillation of the galvanometer. A process from one activation to deactivation of the laser emitter matching the oscillation of the galvanometer is embodied on the target scene by a phenomenon that linear laser moves in a certain continuous area of the scene; a process from one deactivation to activation of the laser emitter matching the oscillation of the galvanometer is embodied on the target scene by a phenomenon that no laser moves in a certain continuous area of the target scene; and further, a process that the laser emitter is controlled by the laser scanning signal to be activated and deactivated for multiple times is embodied as a plurality of "laser moving areas" and "laser-free areas" on the target scene as illustrated in FIG. 3a. The camera exposure signal is configured to control the exposure time of the industrial camera, and after receiving the camera exposure signal, the industrial camera is exposed once within positive oscillation time of the galvanometer, that is, the camera is always in a photosensitive state in the process of one-time positive movement of the galvanometer, so that a process that line laser is projected/not projected in the moving process is recorded as a fringe diagram shown in FIG. 3b by the industrial camera, where a bright fringe is presented at a position corresponding to a laser moving area due to the irradiation of laser, and a dark fringe is presented at a laser-free area.

In some embodiments, during the positive oscillation of the galvanometer, the laser emitter is activated for N times, and accordingly, the laser emitter is deactivated for N times, and N groups of bright and dark fringes are present in the target scene.

In some embodiments, in order to ensure that the fringes in the fringe diagram captured by the camera accurately cover corresponding areas, the industrial camera, the galvanometer, and the laser emitter need to be closely matched. The industrial camera and the laser emitter can meet the requirement of timely response, while the galvanometer has a certain delay. Therefore, in some embodiments, the actual signal waveform of the galvanometer is measured, the feedback about the response of the galvanometer is obtained, and the control signals are adjusted based on the feedback result. It should be noted that, in the embodiments of the present disclosure, the adjustment of the control signals specifically refers to adjustment of the laser scanning signal and the camera exposure signal in the control signals, so as to achieve the purpose of obtaining an accurate fringe diagram.

According to the modulation method for imaging scanning signal synchronization provided by the embodiment of the present disclosure, the control signals including the galvanometer driving signal, the laser scanning signal, and the camera exposure signal are transmitted, the actual oscillation state of the galvanometer controlled by the galvanometer driving signal is detected, and the transmitted control signals are adjusted based on the actual oscillation state of the galvanometer. In this way, the purpose of synchronization that galvanometer oscillation is accurately matched with laser scanning and accurately matched with camera exposure is achieved, and thus a more accurate fringe diagram is obtained in a simple and intelligent manner compared with the result obtained by the related art.

It is understood that, due to the oscillation principle of the galvanometer, the actual signal waveform may be any waveform of a reference measurement capable of reflecting the actual oscillation state of the galvanometer. Optionally, the actual oscillation state of the galvanometer may be described by an actual voltage of the galvanometer, an actual current of the galvanometer, an actual deflection angle of the galvanometer, and an actual moving displacement of a certain reference point on a lens of the galvanometer. Further in some embodiments, the actual signal waveform may be any one of a voltage waveform, a current waveform, a deflection angle waveform of the galvanometer, and a reference point displacement waveform of the galvanometer, and accordingly, in some embodiments, the adjusted control waveform and the actual signal waveform are of a same type.

In some embodiments, filtering and de-noising are performed on the actual signal waveform, where filtering and de-noising are specifically illustrated as preparation operations before a waveform detection is performed on the actual waveform signal, and specifically, the preparation operations may include but are not limited to filtering, signal amplification, signal shaping under the condition of ensuring the waveform characteristics of an original signal, and then a noise-reduced waveform is obtained. The filtering and de-noising can be realized by the related art, which is not particularly limited in the present disclosure.

In some embodiments, the comparison detection may be implemented by using an existing waveform detection method, and optionally, the comparison detection may be implemented according to an image detection algorithm, so as to obtain a waveform deviation between the control waveform and the noise-reduced waveform. In some embodiments, the noise-reduced waveform and the control waveform may be simultaneously inputted into a waveform display to obtain an image including both the noise-reduced waveform and the control waveform, the two waveforms are identified according to pixel values in the image, and the waveform deviation is obtained according to positions of pixels of the two waveforms.

In some embodiments, the adjustment of the control signals may specifically include delay adjustment on the laser scanning signal and the camera exposure signal in the control signals; the method may further includes adding an enabling signal for transmission of the laser scanning signal and the camera exposure signal in the control signals so as to match the actual oscillation condition of the galvanometer to trigger the industrial camera and the laser emitter to be activated, thereby obtaining an accurate fringe diagram.

In some embodiments, the noise-reduced waveform and the control waveform are compared to obtain a difference in an x direction therebetween so as to determine a phase deviation, and the waveform deviation includes the phase deviation. Optionally, the phase may be a phase in time, so that the phase deviation is embodied as a time gap.

Under certain conditions, the lens of the galvanometer is used as a load which oscillates under the driving of the motor of the galvanometer, and if a load of the motor is not matched with the actual load or if the motor is aged, the galvanometer cannot respond in time when receiving the galvanometer driving signal, causing that the linear laser reflected by the galvanometer cannot be accurately projected to the corresponding position of the target scene. Therefore, in some embodiments, the noise-reduced waveform reflects the actual phase in time of the oscillation condition of the lens of the galvanometer, the control waveform reflects the theoretical phase in time of the oscillation condition of the lens of the galvanometer, and the time gap required for the lens of the galvanometer to deflect from the actual phase to the theoretical phase is determined based on the phase deviation; and the galvanometer driving signal is transmitted at a first moment, the laser scanning signal and the camera exposure signal are transmitted at a second moment, and the first moment differs from the second moment by the time gap. Further, in the embodiments, the problem of inaccurate fringe diagram caused by oscillation delay of the galvanometer can be avoided.

In some cases, due to the design problem of the galvanometer itself, at an initial stage of oscillation of the galvanometer started after the galvanometer receives the galvanometer driving signal, the oscillation of the galvanometer is unstable, and a pattern of the fringe diagram obtained subsequently cannot be matched with the required shape. The technicians of the present disclosure found through experimental research that the unstable oscillation condition in the initial stage can be embodied in an initial stage of the actual signal waveform of the galvanometer, and the waveform in the initial stage is not smooth. Furthermore, in some embodiments, the waveform deviation further includes a distinct waveform segment of the noise-reduced waveform that is different from the control waveform in terms of waveform smoothness. In some embodiments, a time interval required for the noise-reduced waveform to pass through the distinct waveform segment is determined; and a moment at which the control signals are transmitted is adjusted based on the phase deviation and the time interval. Thus, the accuracy of the resulting fringe diagram is further improved. In the embodiment of the present disclosure, the laser scanning signal and the camera exposure signal in the control signals are specifically adjusted.

Optionally, in some embodiments, the distinct waveform segment is determined by an image detection algorithm. Alternatively, the noise-reduced waveform and the control waveform can be identified through pixel values, a gradient of pixels describing fluctuation condition of the noise-reduced waveform and a gradient of pixels describing the control waveform are respectively determined, and then the smoothness of the noise-reduced waveform and the smoothness of the control waveform are determined for subsequent comparison.

In some embodiments, a distinct waveform segment is determined, and the waveform deviation includes the distinct waveform segment; a wave value corresponding to a moment at which the waveform smoothness of the noise-reduced waveform is consistent with the waveform smoothness of the control waveform is determined based on the distinct waveform segment; and a transmission enabling signal is set based on the wave value, and the transmission enabling signal controls the transmission of the laser scanning signal and the camera exposure signal. And then, when the fluctuation of the reference measurement describing the oscillation condition of the galvanometer reaches a stable numerical value after a galvanometer delay stage and a galvanometer oscillation unstable stage, the laser scanning signal and the camera exposure signal are transmitted to obtain an accurate fringe diagram.

The related art has a deviated fringe diagram, which is caused by the fact that the actual oscillation condition of the galvanometer is not matched with the exposure (or laser emission) condition of the industrial camera. To obtain the depth image, aiming at the mismatch, in the related art, laser scanning is only performed in an exposure period with the same value to obtain multiple groups of fringe diagrams with the same fringe deviation for fusion, and since the deviations of the multiple groups of fringe diagrams are the same, the generated deviation has little influence on the depth image. However, due to an objective rule that a clear picture of a highly reflective object can only be taken with a short exposure period and a clear picture of a black object can only be taken with a long exposure period, the same exposure period in the related art cannot cover different objects well, and a contour form of the highly reflective object or the less reflective object cannot be obtained. In order to give consideration to both highly reflective and less reflective objects, a technology is to obtain a depth image with the long exposure period and a depth image with the short exposure period respectively and fuse the two depth images, which undoubtedly increases the amount of calculation and results in the problem of slow image generation.

Figure 4:
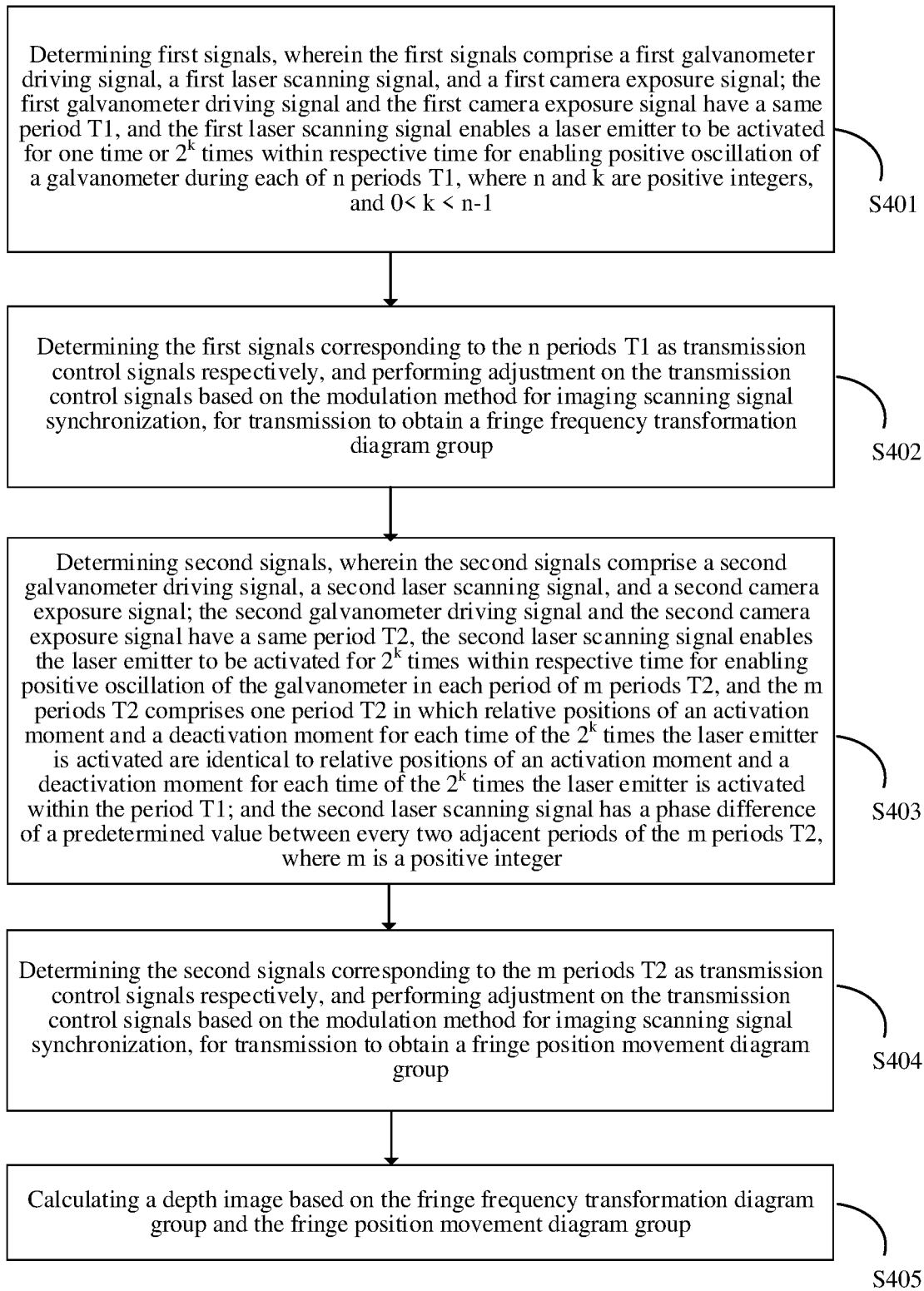
FIG. 4 is a schematic flowchart of a depth image acquisition method based on a modulation method for imaging scanning signal synchronization according to an embodiment of the present disclosure.

In view of the foregoing problems, in a second aspect, an embodiment of the present disclosure provides a depth image acquisition method based on a modulation method for imaging scanning signal synchronization, so as to reduce the calculation amount of 3D imaging while considering both the definition of the highly reflective object and the definition of the less reflective object. As illustrated in FIG. 4, a depth image acquisition method provided in an embodiment of the present disclosure includes the following steps.

At S401, first signals are determined, wherein the first signals include a first galvanometer driving signal, a first laser scanning signal, and a first camera exposure signal; the first galvanometer driving signal and the first camera exposure signal have a same period T1, and the first laser scanning signal enables a laser emitter to be activated for one time or $2^k$ times within respective time for enabling positive oscillation of a galvanometer during each of n periods T1, where n and k are positive integers, and $0<k<n-1$.

In some embodiments, the specific value of n is determined according to actual use requirements.

As can be understood by those skilled in the art, the first galvanometer driving signal is configured to trigger oscillation of the galvanometer, the first laser scanning signal is configured to trigger activation and deactivation of the laser emitter, and the first camera exposure signal is configured to control exposure and photographing of the industrial camera. Since the first galvanometer driving signal and the first camera exposure signal have the same period, exposure of the industrial camera can be performed for shooting in the positive oscillation process of the galvanometer.

In some embodiments, the first laser scanning signal enables the laser emitters to be activated for $2^0, 2^1, 2^2, \ldots$, and $2^k$ times within respective time for enabling positive oscillation of the galvanometer during n periods T1, respectively. For example, n is 4, the laser emitter is activated for 1 time, 2 times, 4 times, and 8 times within respective time for enabling positive oscillation of the galvanometer during the 4 periods T1, respectively, and is deactivated, after being activated, for 1 time, 2 times, 4 times, and 8 times during the 4 periods, respectively. That is, within the time for positive oscillation of the galvanometer during a first period T1, the laser emitter is deactivated after being activated 1 time; within the time for positive oscillation of the galvanometer during a second period T1, the laser emitter is activated for 2 times and is deactivated after each activation; within the time for positive oscillation of the galvanometer during a third period T1, the laser emitter is activated for 4 times and is deactivated after each activation; and during the fourth period T1, the laser emitter is activated for 8 times and is deactivated after each activation.

It will be appreciated by those skilled in the art that the activation of the laser emitter is controlled by a so-called laser scanning signal (in the embodiments of the present disclosure, the signal is referred to as the laser scanning signal because the signal is configured to trigger the emission of laser and enable the scanning of the laser, and if a signal having the same nature is referred to as other names in other cases, the signal also belongs to the laser scanning signal), the laser emitter is activated once when a rising edge is given in the laser scanning signal, and is deactivated when a falling edge is given.

Figure 5A:
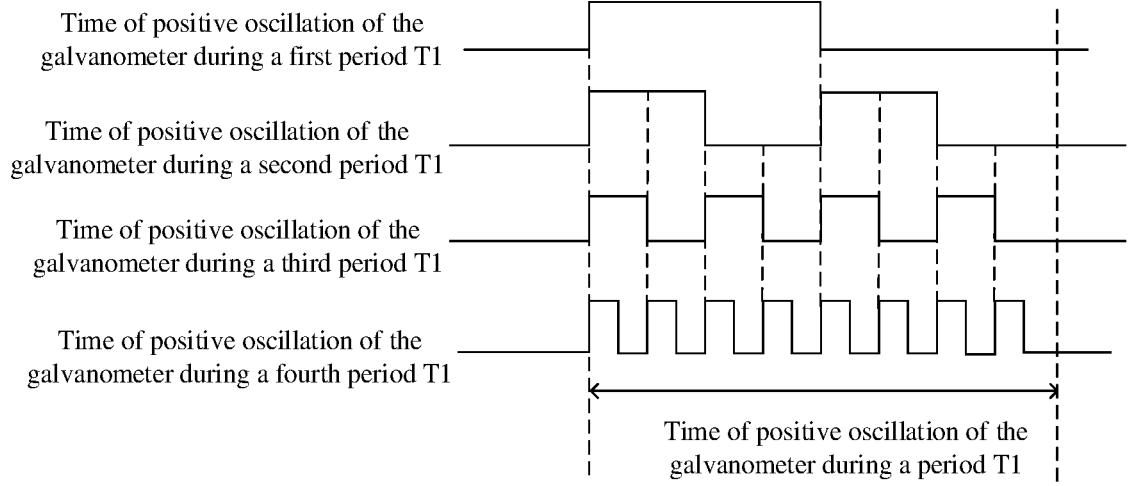
FIG. 5a and FIG. 5b are some schematic diagrams of a first laser scanning signal of a depth image acquisition method based on a modulation method for imaging scanning signal synchronization according to embodiments of the present disclosure.
Figure 5B:
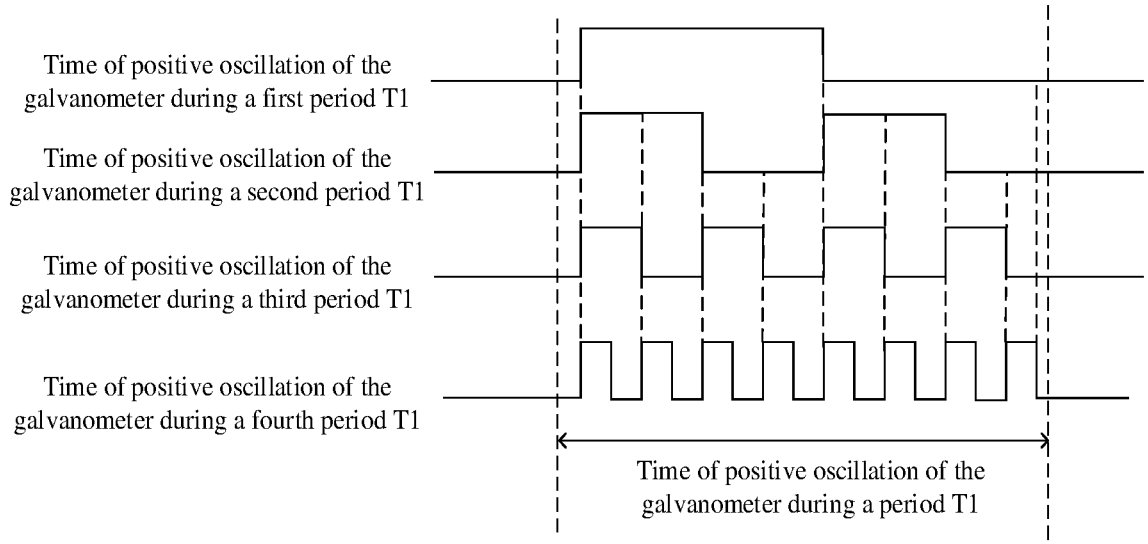

It should be noted that, in some embodiments, for the first laser scanning signal in step S401, an occurrence moment of a first rising edge within respective time for positive oscillation of the galvanometer during different periods T1 has the same position in the respective periods T1. For example, if a first rising edge within time for enabling positive oscillation of the galvanometer during the $1^{st}$ period T1 occurs at a start moment of the period T1, then in each of the subsequent $2^{nd}, 3^{rd} \ldots$, and n-th periods, the first rising edge occurs at the start moment of the time for enabling positive oscillation of the galvanometer during the period T1, as illustrated in FIG. 5a. If the first rising edge in the $1^{st}$ period T1 occurs at a moment differing by a time interval from the start moment of the time for enabling positive oscillation of the galvanometer during the period T1, then in each of the subsequent $2^{nd}, 3^{rd}$ and n-th periods, the first rising edge occurs at a moment differing by the time interval from the start moment of the time for enabling positive oscillation of the galvanometer during the period T1, as illustrated schematically in FIG. 5b.

Figure 6A:
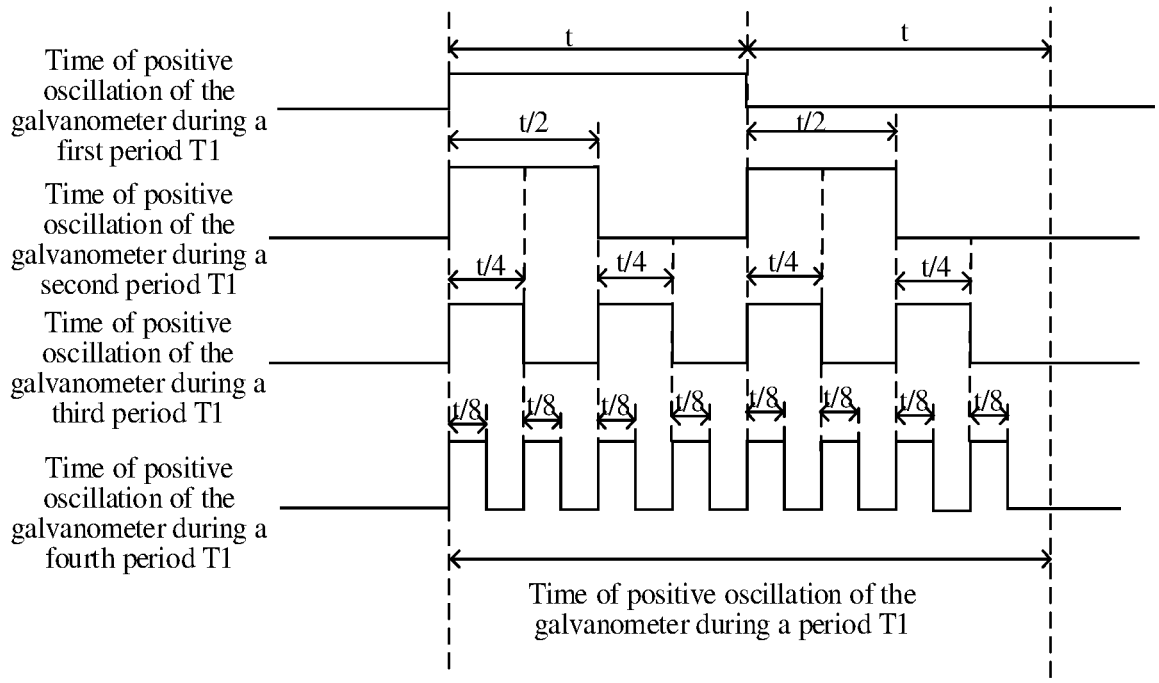
FIG. 6a and FIG. 6b are some other schematic diagrams of a first laser scanning signal of a depth image acquisition method based on a modulation method for imaging scanning signal synchronization according to embodiments of the present disclosure.
Figure 6B:
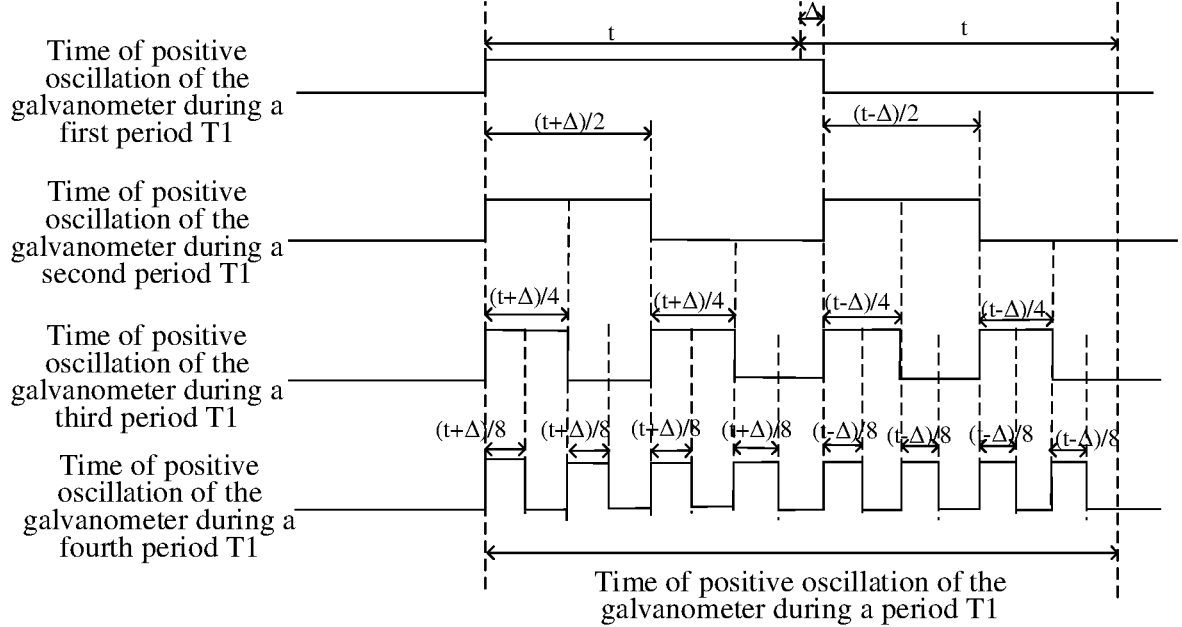

In some embodiments, if a rising edge is present in the signal, a falling edge matching the rising edge appears after a certain time interval, that is, if a certain channel signal triggers a certain device to be activated, the device should be deactivated by the channel signal after a certain time interval, and the time at which the device is activated is set according to requirements. Optionally, if the device is a laser emitter, among different periods T1, an interval between a rising edge and a first subsequent falling edge (and/or between a falling edge and a first subsequent rising edge) in a period T1 is ½ shorter than that in a previous period T1, as the number of occurrences of the period T1 increases. Optionally, if the device is a laser emitter, an interval between a rising edge and a first subsequent falling edge is equal to an interval between a falling edge and a first subsequent rising edge, as illustrated in FIG. 6a. Optionally, if the device is a laser emitter, an interval between a rising edge and a first subsequent falling edge may not be equal to an interval between a falling edge and a first subsequent rising edge, as illustrated in FIG. 6b.

At S402, the first signals corresponding to the n periods T1 are determined as transmission control signals respectively, and adjustment is performed on the transmission control signals based on the modulation method for imaging scanning signal synchronization for transmission to obtain a fringe frequency transformation diagram group.

Figure 7A:
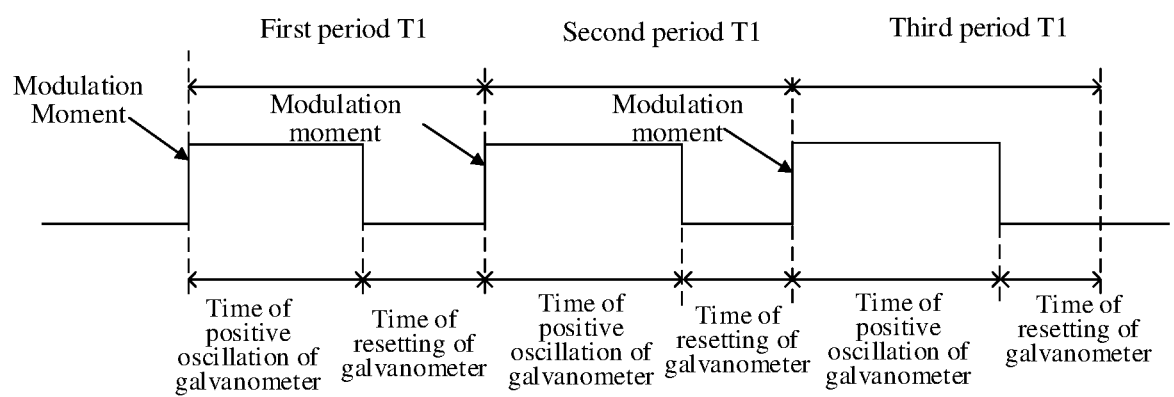
FIG. 7a is a schematic diagram of modulation moments of a depth image acquisition method based on a modulation method for imaging scanning signal synchronization according to an embodiment of the present disclosure.

That is, at the beginning of each period T1, the first signals are modulated according to the first aspect of the embodiments of the present disclosure, so as to achieve the purpose of synchronizing the first galvanometer driving signal, the first laser scanning signal, and the first camera exposure signal, and thus obtain a precise fringe frequency transformation diagram group. Schematically, the moment at which the signals are modulated may be as illustrated in FIG. 7a, and if 3 periods T1 are present, the first signals are modulated according to the first aspect of the embodiments of the present disclosure at the moments indicated by the arrows in FIG. 7.

In step S402, the number of diagrams in the fringe frequency transformation diagram group is n, that is, in a period T1, the industrial camera is exposed once, and a fringe diagram is obtained; in n periods T1, the industrial camera is exposed n times to obtain n fringe diagrams. It should be noted that the exposure time of the industrial camera is the time for positive oscillation of the galvanometer, and if the laser emitter is activated once and correspondingly deactivated once within the time for positive oscillation of the galvanometer in the $1^{st}$ period T1, the $1^{st}$ diagram includes 1 group of bright and dark fringes; if the laser emitter is activated twice and correspondingly deactivated twice within the time for positive oscillation of the galvanometer in the $2^{nd}$ period T1, the $2^{nd}$ diagram includes 2 groups of light and dark fringes; if the laser emitter is activated for 4 times and correspondingly deactivated for 4 times within the time for positive oscillation of the galvanometer in the $3^{rd}$ period T1, the $3^{rd}$ diagram includes 4 groups of light and dark fringes; and if the laser emitter is activated for 8 times and correspondingly deactivated for 8 times within the time for positive oscillation of the galvanometer during the $4^{th}$ period T1, the $4^{th}$ diagram includes 8 groups of light and dark fringes.

Figure 8:
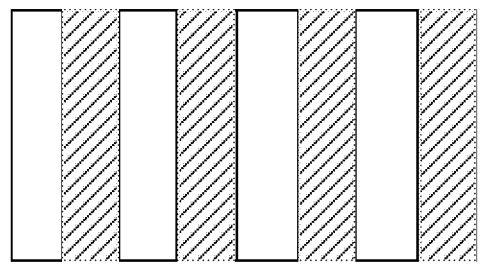
FIG. 8 is a schematic diagram of a fringe diagram of a depth image acquisition method based on a modulation method for imaging scanning signal synchronization according to an embodiment of the present disclosure.

In some embodiments, the diagram includes a schematic diagram of 4 groups of light and dark fringes, as illustrated in FIG. 8.

At S403, second signals are determined, wherein the second signals include a second galvanometer driving signal, a second laser scanning signal, and a second camera exposure signal; the second galvanometer driving signal and the second camera exposure signal have a same period T2, the second laser scanning signal enables the laser emitter to be activated for $2^k$ times within respective time for enabling positive oscillation of the galvanometer in each period of m periods T2, and the m periods T2 includes one period T2 in which relative positions of an activation moment and a deactivation moment for each time of the $2^k$ times the laser emitter is activated are identical to relative positions of an activation moment and a deactivation moment for each time of the $2^k$ times the laser emitter is activated within the period T1; and the second laser scanning signal has a phase difference of a predetermined value between every two adjacent periods of the m periods T2, where m is a positive integer.

The second galvanometer driving signal is configured to trigger oscillation of the galvanometer, the second laser scanning signal is configured to trigger activation and deactivation of the laser emitter, and the second camera exposure signal is configured to control exposure and photographing of the industrial camera. The second galvanometer driving signal and the second camera exposure signal have the same period, so that the camera is exposed to take a picture in the positive oscillation process of the galvanometer.

In the period T2 in step S403, the laser emitter is activated $2^k$ times, and if the period T2 occurs m times, the laser emitter is activated $2^k$ times for each of the m times. For example, if n is 4, the laser emitter is activated 8 times for each of the m times.

In some embodiments, the relative positions of the activation (deactivation) moments are the same in different periods, which implies that if the activation (deactivation) moments are at ¼, 2/4, ¾, and 4/4 of a certain period, a corresponding device should also be activated (deactivated) at ¼, 2/4, ¾, and 4/4 of another period containing different time from the period. The relative positions are determined based on the related art by changing the period after determining the corresponding waveform.

It will be appreciated by those skilled in the art that the activation/deactivation of the laser emitter in some embodiments is controlled by the rising edge/falling edge in the laser scanning signal.

In some embodiments, m may be the same as n; or, in other embodiments, there is no correlation between m and n, and the value of m is set according to specific needs.

In some embodiments, the phase of the second laser scanning signal is different in the m periods T2, specifically, a phase difference of a predetermined value exists between every two adjacent periods in the m periods T2. For example, if a start moment of the second laser scanning signal in the $1^{st}$ period T2 is "a start moment of positive oscillation of the galvanometer in the period T2"; a start moment of the second laser scanning signal in the $2^{nd}$ period T2 is "a start moment of the positive oscillation of the galvanometer mirror in the period T2+a certain time interval t", i.e., the start moment of the second laser scanning signal in the $1^{st}$ period plus the time interval t; a start moment of the second laser scanning signal in the $3^{rd}$ period T2 is "a start moment of the positive oscillation of the galvanometer in the period T2+2×t", that is, the time interval t is added on the basis of the start moment of the second laser scanning signal in the $2^{nd}$ period T2 until it is determined that a start moment of the second laser scanning signal in the $m^{th}$ period T2 is "a start moment of positive oscillation of the galvanometer in the period T2+(m−1)×t", i.e., a start moment of the second laser scanning signal in the $(m-1)^{th}$ period T2 plus the time interval t.

In some embodiments, one of T1 and T2 is a relatively long period, and the other one of T1 and T2 is a relatively short period.

At S404, the second signals corresponding to the m periods T2 are determined as transmission control signals respectively, and adjustment is performed on the transmission control signals based on the modulation method for imaging scanning signal synchronization, for transmission to obtain a fringe position movement diagram group.

In step S404, the number of diagrams in the fringe position movement diagram group is m, that is, in one period T2, the industrial camera is exposed once, and one fringe diagram is obtained; in m periods T2, the industrial camera is exposed m times to obtain m fringe diagrams.

At S405, a depth image is calculated based on the fringe frequency transformation diagram group and the fringe position movement diagram group.

In some embodiments, the depth image may be calculated from the fringe frequency transformation diagram group and the fringe position movement diagram group according to the related art.

According to the depth image acquisition method based on the modulation method for imaging scanning signal synchronization, signals in the imaging scanning process are modulated based on the modulation method for imaging scanning signal synchronization, then a fringe frequency transformation diagram group is obtained by using T1 as a period, a fringe position movement diagram group is obtained by using T2 as a period, and then the depth image is calculated based on the two diagram groups. In the process of obtaining the fringe diagram, the transmitted signals are modulated according to the modulation method for imaging scanning signal synchronization, the actual fringes obtained according to the embodiments of the present disclosure have no deviation from the theoretical condition, and therefore, in the process of obtaining the depth image based on the fringe diagram, the method provided in the embodiments of the present disclosure does not need to consider the problem of the deviation of the fringe diagram. Compared with the related art, the method provided in the embodiments of the present disclosure reduces the amount of calculation in the imaging process while ensuring that contour states of objects in a scene containing both highly reflective objects and less reflective objects are clear and positions of the objects are accurate.

Optionally, in some preferred embodiments, the method provided in the embodiments of the present disclosure may further include the following steps: determining third signals, wherein the third signals include the second galvanometer driving signal, a third laser scanning signal, and a third camera exposure signal; the third laser scanning signal includes m second laser scanning signal periods and m sine fringe correction periods corresponding to the m second laser scanning signal periods; each of the m sine fringe correction periods includes h correction sub-periods, and a number of times the laser emitter is activated in any correction sub-period within time for enabling positive oscillation of the galvanometer in the period T2 and a number of times the laser emitter is activated within a second laser scanning signal period corresponding to the correction sub-period are both $2^k$; an activated duration in any correction sub-period in any sine fringe correction period is shortened compared with an activated duration in a second laser scanning signal period corresponding to the correction sub-period, and a range in the period T2 occupied by the activated duration in the correction sub-period is within a range in the period T2 occupied by the activated duration in the second laser scanning signal period corresponding to the correction sub-period; for a same sine fringe correction period, the activated duration is shortened differently for the h correction sub-periods; a period T3 of the third camera exposure signal is (h×m) periods T2, wherein the activated duration is a time span from a certain activation moment of the laser emitter to a first deactivation moment subsequent to the activation moment; and determining the third signals as transmission control signals, and performing adjustment on the transmission control signals based on the modulation method for imaging scanning signal synchronization, for transmission to obtain a sine wave fringe diagram. Further, in the process of acquiring the depth image, the depth image is calculated based on the fringe frequency transformation diagram group, the fringe position movement diagram group, and the sine wave fringe image. Thus, a more accurate depth image can be obtained.

In some embodiments of the present disclosure, time for obtaining the depth image is: n×T1+m×T2+(h×m) T2. Preferably, the period T2 is shorter than the period T1, so as to further shorten the depth image acquisition time on the basis of the foregoing advantageous effects. It can be understood by those skilled in the art that, since the related art cannot obtain the fringe diagrams in different periods, but can only obtain the fringe frequency transformation diagram group, the fringe position movement diagram group, and the sine wave fringe diagram in the same exposure period, the exposure period cannot be determined too short while the accuracy of the depth image is ensured. When T2 is shorter than T1, the embodiments of the present disclosure can save the acquisition time of the depth image compared with the related art while ensuring the same accuracy of the depth image with a smaller calculation amount. For example, T2 can be ½T1, ⅓T1, or ¼T1. When T2 is ½T1, the exposure time in one period T1 is equal to the exposure time of two periods T2; when T2 is ⅓T1, the exposure time in one period T1 is equal to the exposure time of three periods T2; and when T2 is ¼T1, the exposure time in 1 T1 is equal to the exposure time of four periods T2. That is, since the exposure time of a plurality of periods T2 for scanning is made equal to the exposure time of the period T1, a fixed exposure time can be used. Conversely, if T2 is equal to T1 or T2 is greater than T1, the total depth image acquisition time will be greatly increased. Under the premise that T1 is fixed, that is, the exposure time of the period T1 is fixed, the acquisition time n×T1+m×T2+(h×m)×T2 under the condition of T2<T1 is much smaller than the acquisition time n×T1+m×T1+(h×m)×T1 under the condition of T2=T1.

In some embodiments, in m second laser scanning signal periods, the second laser scanning signal enables the laser emitter to be activated for $2^k$ times, and the m periods T2 includes one period T2 in which relative positions of an activation moment and a deactivation moment for each time of the $2^k$ times the laser emitter is activated are identical to relative positions of an activation moment and a deactivation moment for each time of the $2^k$ times the laser emitter is activated within the period T1; and the second laser scanning signal has a phase difference of a predetermined value between every two adjacent periods of the m periods T2. Each second laser scanning signal period corresponds to one sine fringe correction period so as to optimize and correct, in the sine fringe correction period, sine fringes in the fringe diagram generated under driving of a laser scanning signal having a respective phase within the second laser scanning signal period. Each sine fringe correction period includes h correction sub-periods, and then the fringes generated in the h correction sub-periods and the fringes of the corresponding second laser scanning signal period can be subjected to composition, so that the edge between light and dark fringes in the fringes projected in the second laser scanning signal period tends to be blurred, the blurring degree increases with the increase of the value of h, optionally, h can be 3 or 7, and then, the 4-step composition or 8-step composition can be performed on the fringe diagrams. Specifically, in each of the h correction sub-periods, the laser emitter is activated for $2^k$ times, and an activated duration for each of the $2^k$ times the laser emitter is activated in the correction sub-period is shortened compared with an activated duration for a corresponding time the laser emitter is activated in a corresponding second laser scanning signal period; and a range in the period T2 occupied by each activated duration in the correction sub-period is within a range in the period T2 occupied by the corresponding activated duration in the corresponding second laser scanning signal period.

Figure 7B:
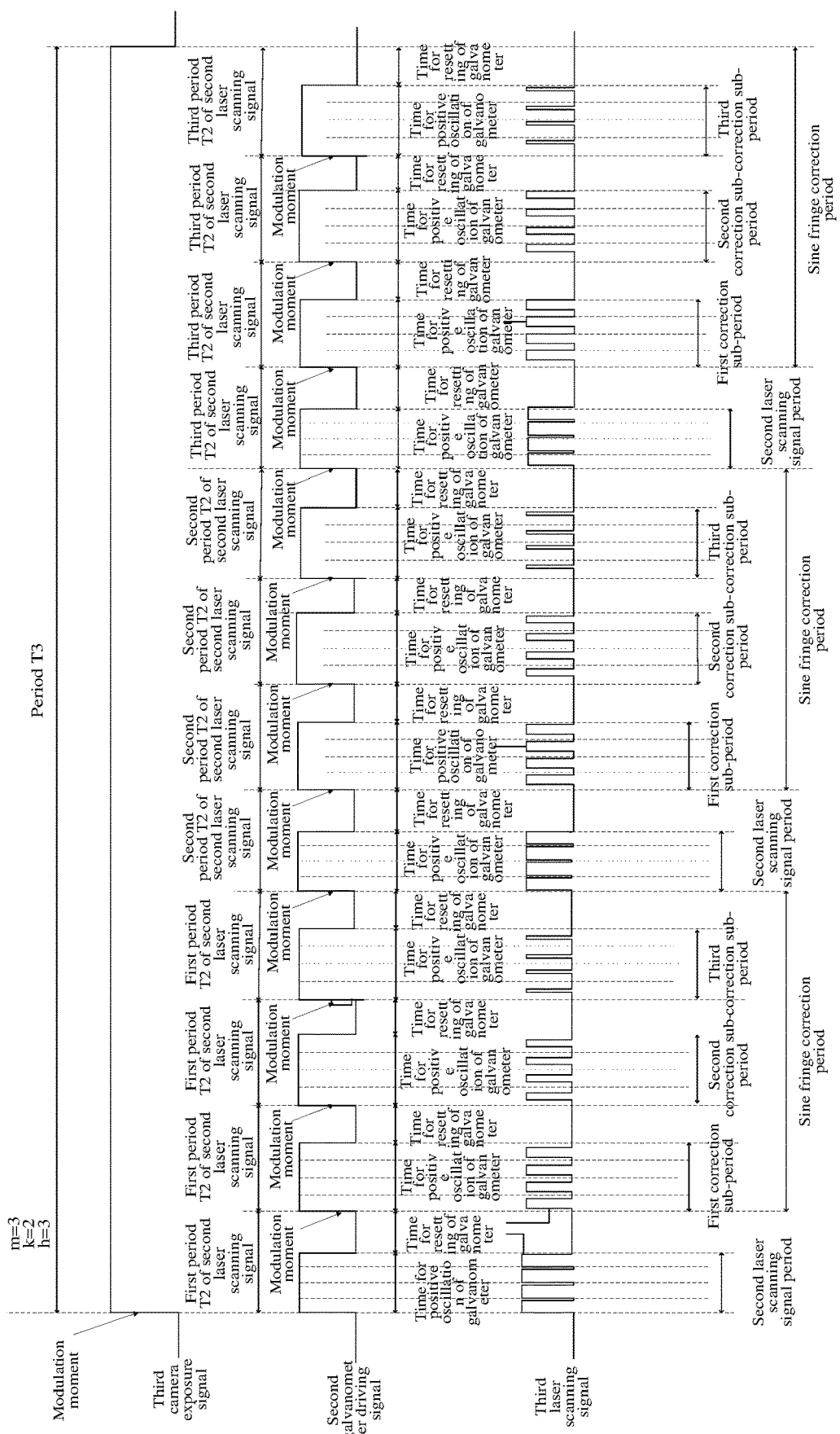
FIG. 7b is a schematic diagram of third signals of the depth image acquisition method based on a modulation method for imaging scanning signal synchronization according to the embodiment of the present disclosure.
Figure 7C:
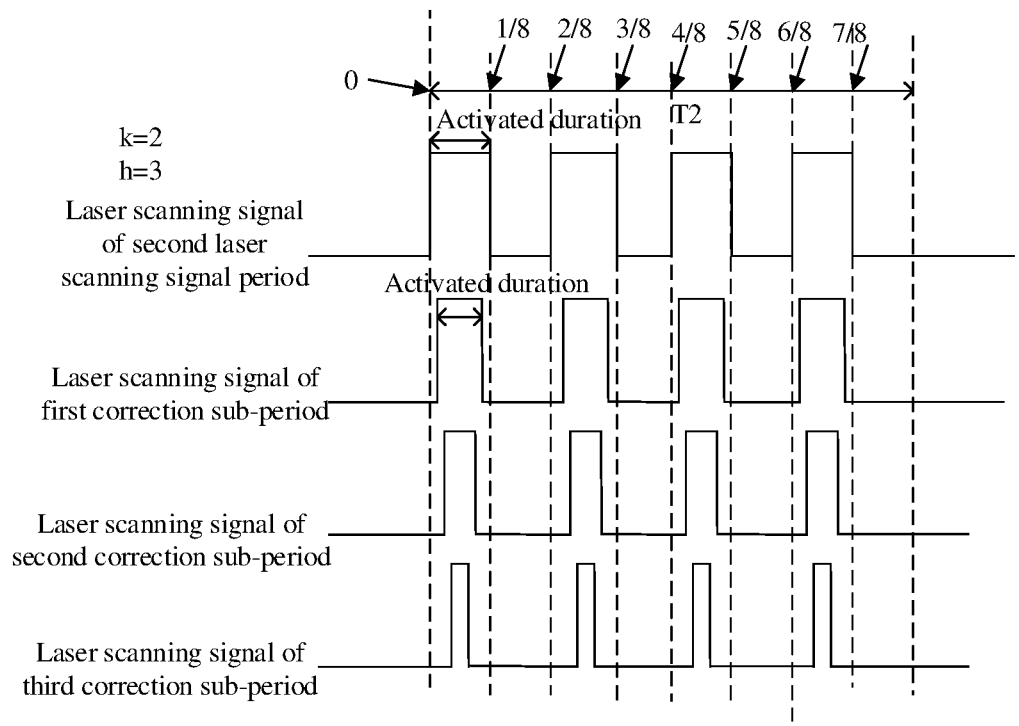
FIG. 7c is a schematic diagram of a laser scanning signal in a sine fringe correction period of a depth image acquisition method based on a modulation method for imaging scanning signal synchronization according to an embodiment of the present disclosure.

In some embodiments, the corresponding relationship of the second laser scanning signal of the m second laser scanning signal periods, the corresponding sine fringe correction periods, and the h correction sub-periods in each sine fringe correction period may be as illustrated in FIG. 7b, for example, if m is 3, k is 2, and h is 3, then the laser emitter is activated by the second laser scanning signal for $2^2$ times within respective time for enabling positive oscillation of the galvanometer in each of 3 periods T2, corresponding to the second laser scanning signal period in "the $1^{st}$ period T2 of the second laser scanning signal", the second laser scanning signal period in "the $2^{nd}$ period T2 of the second laser scanning signal", and the second laser scanning signal period in "the $3^{rd}$ period T2 of the second laser scanning signal"; the laser scanning signal of "the second laser scanning signal period" of "the $2^{nd}$ period T2" of the second laser scanning signal has a phase difference of a predetermined value from the laser scanning signal of "the second laser scanning signal period" of "the $1^{st}$ period T2" of the second laser scanning signal; and the laser scanning signal of the "second laser scanning signal period" of "the $3^{rd}$ period T2" of the second laser scanning signal has a phase difference of a predetermined value from the laser scanning signal of the "second laser scanning signal period" of "the $2^{nd}$ period T2" of the second laser scanning signal. The "second laser scanning signal periods" of the 3 periods T2 each correspond to one "sine fringe correction period". In each "sine fringe correction period", the sine fringe correction is performed based on the second laser scanning signal in a "second laser scanning signal period" corresponding to the "sine fringe correction period". A specific example of performing sine correction on the second laser scanning signal in a certain period T2 (which may be the $1^{st}$ period T2 in FIG. 7b, or the $2^{nd}$ period T2 in FIG. 7b, or the $3^{rd}$ period T2 in FIG. 7 b), i.e., on the second laser scanning signal of a certain phase, is shown in FIG. 7c. For example, in FIG. 7c, k=2, h=3, the "sine fringe correction period" includes 3 "correction sub-periods", the laser emitter is activated for $2^2$ times in each "correction sub-period", and the number of times the laser emitter is activated in the "correction sub-period" is consistent with the number of times the laser emitter is activated by the laser scanning signal in the "second laser scanning signal period" corresponding to the correction sub-period. In some embodiments, a time span from an activation moment for each time to a first deactivation moment subsequent to the activation moment is referred to as an activated duration. As illustrated in FIG. 7c, the activated durations in the same correction sub-period are the same, and the activated duration in the correction sub-period is shortened compared with the "laser scanning signal in the second laser scanning signal period corresponding to the correction sub-period" (in other embodiments, "the laser scanning signal in the second laser scanning signal period corresponding to the correction sub-period" is also referred to as the second laser scanning signal in the corresponding sequential-numbered period, for example, the second laser scanning signal in the $3^{rd}$ period T2, or the second laser scanning signal in the $2^{nd}$ period T2, etc.), and the range in the period T2 occupied by the activated duration in the correction sub-period is within the range in the period T2 occupied by the activated duration in the second laser scanning signal period corresponding to the correction sub-period, for example, as illustrated in FIG. 7c, the activated durations of the signal in the second laser scanning signal period are from 0 point to ⅛ point, ⅖ point to ⅜ point, ⅘ point to ⅝ point, and ⅝ to ⅞ point of the period T2, the activated durations of the scanning signal of each correction sub-period are located in the ranges from 0 point to ⅛ point, ⅖ point to ⅜ point, ⅘ point to ⅝ point, and ⅝ point to ⅞ point of the period T2, respectively, and are each preferably located at the center of the corresponding range.

In some embodiments, as illustrated in FIG. 7c, compared with the activated duration of the second laser scanning signal period, the activated duration is shortened differently for different correction sub-periods, for example, the activated duration may be shortened by Δ in the $1^{st}$ correction sub-period, by 2×Δ in the $2^{nd}$ correction sub-period, and by 3×Δ in the $3^{rd}$ correction sub-period; alternatively, the activated duration is shortened by 3×Δ in the 1 correction sub-period, by 2×Δ in the $2^{nd}$ correction sub-period, and by A in the $3^{rd}$ correction sub-period; or even reductions in other orders are possible.

Referring to FIG. 7b, in T3, the camera is always exposed, so that a sine wave fringe diagram can be obtained.

In some embodiments, the third signals are used as the transmission control signals, and are adjusted based on the modulation method for imaging scanning signal synchronization provided in the first aspect of the present disclosure, for transmission. Specifically, as illustrated by the modulation moments in FIG. 7b, the third camera exposure signal and the third laser scanning signal are modulated first, and subsequently, the third laser scanning signal is modulated at the start moment of each period T2, so as to achieve scanning synchronization.

Figure 9:
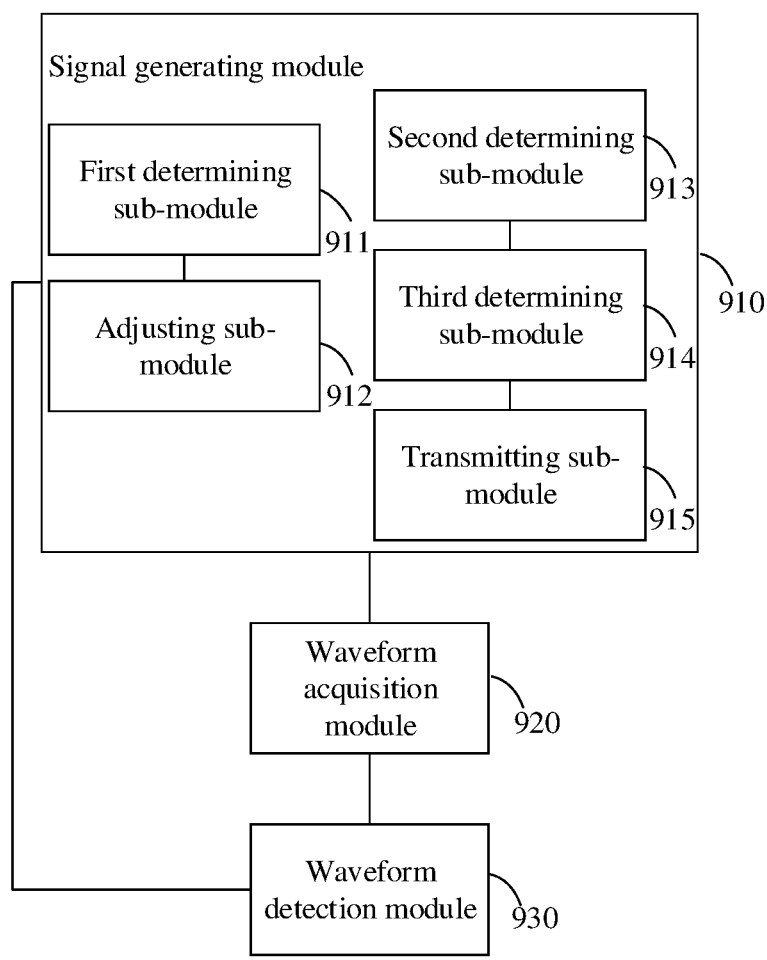
FIG. 9 is a schematic structural diagram of an apparatus for imaging scanning signal synchronous modulation according to an embodiment of the present disclosure.

In a third aspect, as illustrated in FIG. 9, an embodiment of the present disclosure further provides a modulation apparatus for imaging scanning signal synchronization, including: a signal generating module 910 configured to generate and transmit control signals, wherein the control signals include a galvanometer driving signal, a laser scanning signal, and a camera exposure signal, the galvanometer driving signal and the camera exposure signal have a same period, and the laser scanning signal enables laser to be emitted for N times within time for enabling positive oscillation of a galvanometer in one period of the galvanometer driving signal; a waveform acquisition module 920 configured to measure an actual signal waveform of the galvanometer, obtain a noise-reduced waveform by filtering and de-noising the actual signal waveform, and transmit the noise-reduced waveform to a waveform detection module 930; and the waveform detection module 930 configured to perform a waveform comparison detection on the noise-reduced waveform and a control waveform corresponding to the galvanometer driving signal to obtain a waveform deviation, and transmit the waveform deviation to the signal generating module 910. The signal generating module 910 is further configured to adjust the control signals based on the waveform deviation and transmit the adjusted control signals.

Optionally, the waveform detection module 930 is further configured to compare the noise-reduced waveform with the control waveform to determine a phase deviation, the waveform deviation including the phase deviation.

Optionally, the noise-reduced waveform reflects an actual phase in time of oscillation of a lens of the galvanometer, and the control waveform reflects a theoretical phase in time of the oscillation of the lens of the galvanometer, and a time gap required for the lens of the galvanometer to deflect from the actual phase to the theoretical phase is determined based on the phase deviation.

The signal generating module 910 is further configured to transmit the galvanometer driving signal at a first moment, and transmit the laser scanning signal and the camera exposure signal at a second moment, wherein the first moment differs from the second moment by the time gap.

Optionally, the waveform deviation further includes a distinct waveform segment of the noise-reduced waveform that is different from the control waveform in terms of waveform smoothness.

The signal generating module 910 includes a first determining sub-module 911 configured to determine a time interval required for the noise-reduced waveform to pass through the distinct waveform segment; and an adjusting sub-module 912 configured to adjust, based on the phase deviation and the time interval, a moment at which the control signals are transmitted.

Optionally, the signal generating module 910 includes a second determining sub-module 913 configured to determine a distinct waveform segment, the waveform deviation including the distinct waveform segment; a third determining sub-module 914 configured to determine, based on the distinct waveform segment, a wave value corresponding to a moment at which a waveform smoothness of the noise-reduced waveform is consistent with a waveform smoothness of the control waveform; and a transmitting sub-module 915 configured to determine a transmission enabling signal based on the wave value, wherein the transmission enabling signal controls transmission of the laser scanning signal and the camera exposure signal.

Optionally, the actual signal waveform is any one of a voltage waveform, a current waveform, a deflection angle waveform, or a reference point displacement waveform of the galvanometer; and the control waveform and the actual signal waveform are of a same type.

Figure 10:
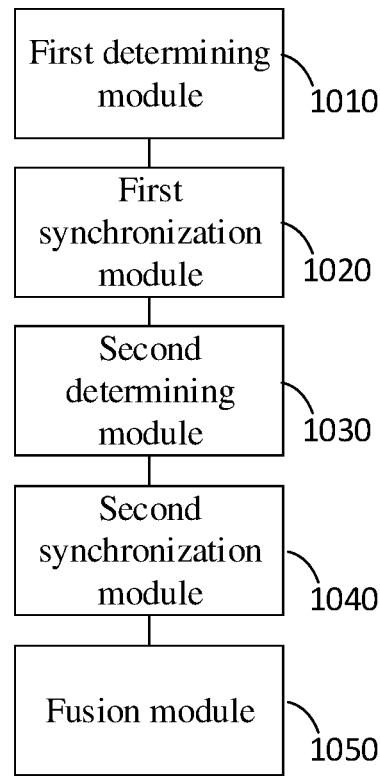
FIG. 10 is a schematic structural diagram of a depth image acquisition apparatus based on a modulation method for imaging scanning signal synchronization according to an embodiment of the present disclosure.

In a fourth aspect, as illustrated in FIG. 10, an embodiment of the present disclosure further provides a depth image acquisition apparatus based on a modulation method for imaging scanning signal synchronization.

The depth image acquisition apparatus includes a first determining module 1010 configured to determine first signals, wherein the first signals include a first galvanometer driving signal, a first laser scanning signal, and a first camera exposure signal; the first galvanometer driving signal and the first camera exposure signal have a same period T1, and the first laser scanning signal enables a laser emitter to be activated for one time or $2^k$ times within respective time for enabling positive oscillation of a galvanometer during each of n periods T1, where n and k are positive integers, and 0<k<n−1; a first synchronization module 1020 configured to determine first signals corresponding to the n periods T1 as transmission control signals, and perform adjustment on the transmission control signals based on the modulation method for imaging scanning signal synchronization, for transmission to obtain a fringe frequency transformation diagram group; a second determining module 1030 configured to determine second signals, wherein the second signals include a second galvanometer driving signal, a second laser scanning signal, and a second camera exposure signal; the second galvanometer driving signal and the second camera exposure signal have a same period T2, the second laser scanning signal enables the laser emitter to be activated for $2^k$ times within respective time for enabling positive oscillation of the galvanometer in each period of m periods T2, and the m periods T2 includes one period T2 in which relative positions of an activation moment and a deactivation moment for each time of the $2^k$ times the laser emitter is activated are identical to relative positions of an activation moment and a deactivation moment for each time of the $2^k$ times the laser emitter is activated within the period T1; and the second laser scanning signal has a phase difference of a predetermined value between every two adjacent periods of the m periods T2, where m is a positive integer; a second synchronization module 1040 configured to determine second signals corresponding to the m periods T2 as transmission control signals respectively, and perform adjustment on the transmission control signals based on the modulation method for imaging scanning signal synchronization, for transmission to obtain a fringe position movement diagram group; and a fusion module 1050 configured to calculate a depth image based on the fringe frequency transformation diagram group and the fringe position movement diagram group.

Optionally, the period T2 is shorter than the period T1; the apparatus further includes: a third determining module configured to determine third signals, wherein the third signals include the second galvanometer driving signal, a third laser scanning signal, and a third camera exposure signal; the third laser scanning signal includes m second laser scanning signal periods and m sine fringe correction periods corresponding to the m second laser scanning signal periods; each of the m sine fringe correction period includes h correction sub-periods, and a number of times the laser emitter is activated in any correction sub-period within time for enabling positive oscillation of the galvanometer in the period T2 and a number of times the laser emitter is activated within a second laser scanning signal period corresponding to the correction sub-period are both $2^k$; an activated duration in any correction sub-period in any sine fringe correction period is shortened compared with an activated duration in a second laser scanning signal period corresponding to the correction sub-period, and a range in the period T2 occupied by the activated duration in the correction sub-period is within a range in the period T2 occupied by the activated duration in the second laser scanning signal period corresponding to the correction sub-period; for a same sine fringe correction time period, the activated duration is shortened differently for the h correction sub-periods; a period T3 of the third camera exposure signal is (h×m) periods T2, wherein the activated duration is a time span from a certain activation moment of the laser emitter to a first deactivation moment subsequent to the activation moment; and a third synchronization module configured to determine the third signals as transmission control signals, and perform adjustment on the transmission control signals based on the modulation method for imaging scanning signal synchronization, for transmission to obtain a sine wave fringe diagram; and the fusion module 1050 is further configured to calculate the depth image based on the fringe frequency transformation diagram group, the fringe position movement diagram group, and the sine wave fringe image.

Figure 11:
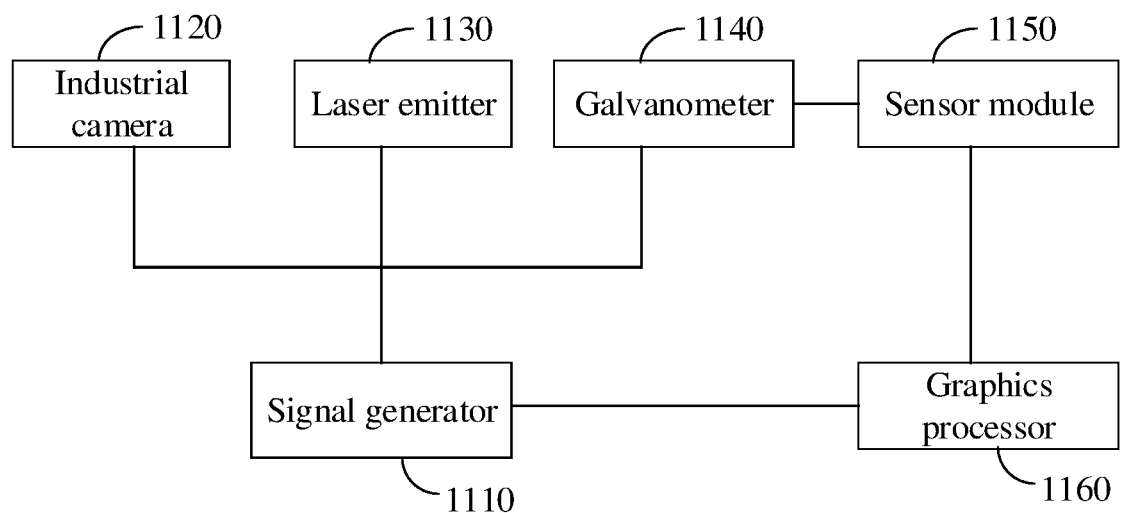
FIG. 11 is a schematic structural diagram of a modulation system for imaging scanning signal synchronization according to an embodiment of the present disclosure.

In a fifth aspect, as illustrated in FIG. 11, an embodiment of the present disclosure further provides a modulation system for imaging scanning signal synchronization, including a signal generator 1110; an industrial camera 1120, a laser emitter 1130, and a galvanometer 1140 that are respectively in communication connection with the signal generator; a sensor module 1150 in communication connection with the galvanometer; and a graphics processor 1160 in communication connection with the signal generator 1110 and the sensor module 1150 respectively.

The signal generator 1110 is configured to transmit control signals to the industrial camera 1120, the laser emitter 1130, and the galvanometer 1130, and simultaneously transmit the control signals to the graphics processor 1160.

The sensor module 1150 is configured to collect an actual signal waveform capable of reflecting an actual state of the galvanometer, output a noise-reduced waveform and transmit the noise-reduced waveform to the graphics processor 1160.

The graphics processor 1160 is configured to perform detection comparison on the actual signal waveform and a galvanometer driving signal for the galvanometer in the control signals, and transmit a result of the detection comparison to the signal generator 1110 to adjust the control signals.

The embodiments of the present disclosure further provide a computer-readable storage medium having a computer program stored thereon, and the computer program, when executed by a processor, implements the method described as above.

Reference throughout this specification, description with reference to the phrase "an embodiment", "some embodiments", "an example", "a specific example", or "some examples" means that a particular feature, structure, material, or characteristic described in connection with the embodiment or example is included in at least one embodiment or example of the present disclosure. The appearances of the above phrases in various places throughout this specification are not necessarily referring to the same embodiment or example of the present disclosure. Furthermore, the particular features, structures, materials, or characteristics may be combined in any suitable manner in one or more embodiments or examples. In addition, different embodiments or examples and features of different embodiments or examples described in the specification may be combined by those skilled in the art without mutual contradiction.

In addition, terms such as "first" and "second" are used herein for purposes of description and are not intended to indicate or imply relative importance or significance or implicitly indicate the number of the indicated features. Thus, the feature defined with "first" and "second" may explicitly or implicitly comprise one or more such features. In the description of the present disclosure, "a plurality of" means at least two, for example, two or three, etc., unless specified otherwise.

Any process or method described in a flow chart or described herein in other ways may be understood to include one or more modules, segments or portions of codes of executable instructions for achieving specific logical functions or process steps, and the scope of preferred embodiments of the present disclosure includes other implementations, which should be understood by those skilled in the art. It is understood by those skilled in the art to which the embodiment of the present disclosure belongs that the functions may be performed in a substantially simultaneous manner or in a reverse order, not in the order shown or discussed, depending on the functions involved.

The logic and/or steps shown in the flow chart or described in other manners herein, for example, may be considered as a particular sequence table of executable instructions for realizing the logical functions, and may be specifically achieved in any computer readable medium to be used by the instruction execution system, device or equipment (such as the system based on computers, the system comprising processors or other systems capable of obtaining instructions from the instruction execution system, device and equipment and executing the instructions), or to be used in combination with the instruction execution system, device and equipment. As to the specification, "the computer readable medium" may be any device adapted for including, storing, communicating, propagating or transferring programs to be used by or in combination with the instruction execution system, device or equipment. More specific examples of the computer readable medium comprise but are not limited to: an electric connection (an electronic device) with one or more wires, a portable computer disk (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by hardware, software, firmware or a combination thereof. In the above embodiments, a plurality of steps or methods may be realized by software or firmware stored in the memory and executed by an appropriate instruction execution system. For example, if it is realized by the hardware, likewise in another embodiment, it may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

It would be understood by those skilled in the art that all or a part of the steps carried by the method in the above-described embodiments may be completed by relevant hardware instructed by a program. The program may be stored in a computer readable storage medium. When the program is executed, one or a combination of the steps of the method in the above-described embodiments may be included.

In addition, individual functional units in the embodiments of the present disclosure may be integrated in one processing module or may be separately physically present, or two or more units may be integrated in one module. The integrated module as described above may be achieved in the form of hardware, or may be achieved in the form of a software functional module. If the integrated module is achieved in the form of a software functional module and sold or used as a separate product, the integrated module may also be stored in a computer readable storage medium.

The storage medium mentioned above may be read-only memories, magnetic disks or CD, etc. Although embodiments of the present disclosure have been shown and described, it would be appreciated by those skilled in the art that the above embodiments cannot be construed to limit the present disclosure, and changes, modifications, substitutions and variations can be made to the embodiments without departing from the scope of the present disclosure.

What is claimed is:

1. A modulation method for imaging scanning signal synchronization, comprising:
   transmitting control signals, wherein the control signals comprise a galvanometer driving signal, a laser scanning signal, and a camera exposure signal, the galvanometer driving signal and the camera exposure signal have a same period, and the laser scanning signal enables laser to be emitted for N times within time for enabling positive oscillation of a galvanometer in one period of the galvanometer driving signal;
   measuring an actual signal waveform of the galvanometer, and obtaining a noise-reduced waveform by filtering and de-noising the actual signal waveform;
   performing a waveform comparison detection on the noise-reduced waveform and a corresponding control waveform for the galvanometer driving signal to obtain a waveform deviation; and
   adjusting the laser scanning signal and the camera exposure signal based on the waveform deviation and transmitting the adjusted laser scanning signal and the adjusted camera exposure signal.

2. The method according to claim 1, wherein said performing the waveform comparison detection on the noise-reduced waveform and the corresponding control waveform corresponding to the galvanometer driving signal to obtain the waveform deviation comprises:
   comparing the noise-reduced waveform with the control waveform to determine a phase deviation, wherein the waveform deviation comprises the phase deviation.

3. The method according to claim 2, wherein the noise-reduced waveform reflects an actual phase in time of oscillation of a lens of the galvanometer, the control waveform reflects a theoretical phase in time of the oscillation of the lens of the galvanometer, and a time gap required for the lens of the galvanometer to deflect from the actual phase to the theoretical phase is determined based on the phase deviation,
   wherein said adjusting the laser scanning signal and the camera exposure signal based on the waveform deviation comprises:
   transmitting the galvanometer driving signal at a first moment, and transmitting the laser scanning signal and the camera exposure signal at a second moment, wherein the first moment differs from the second moment by the time gap.

4. The method according to claim 2, wherein the waveform deviation further comprises a distinct waveform segment of the noise-reduced waveform, the distinct waveform segment being different from the control waveform in terms of waveform smoothness;
   wherein said adjusting the laser scanning signal and the camera exposure signal based on the waveform deviation comprises:
   determining a time interval required for the noise-reduced waveform to pass through the distinct waveform segment; and
   adjusting, based on the phase deviation and the time interval, a moment at which the laser scanning signal and the camera exposure signal are transmitted.

5. The method according to claim 1, wherein said adjusting the laser scanning signal and the camera exposure signal based on the waveform deviation comprises:
   determining a distinct waveform segment, the waveform deviation comprising the distinct waveform segment;
   determining, based on the distinct waveform segment, a wave value corresponding to a moment at which a waveform smoothness of the noise-reduced waveform is consistent with a waveform smoothness of the control waveform; and determining a transmission enabling signal based on the wave value, wherein the transmission enabling signal controls transmission of the laser scanning signal and the camera exposure signal.

6. The method according to claim 1, wherein the actual signal waveform is any one of a voltage waveform, a current waveform, a deflection angle waveform, or a reference point displacement waveform of the galvanometer; and the control waveform and the actual signal waveform are of a same type.

7. A modulation system for imaging scanning signal synchronization, comprising:
   a signal generator;
   an industrial camera, a laser emitter, and a galvanometer that are respectively in communication connection with the signal generator;
   a sensor in communication connection with the galvanometer; and
   a graphics processor in communication connection with the signal generator and the sensor respectively,
   wherein the signal generator is configured to transmit control signals to the industrial camera, the laser emitter, and the galvanometer, and simultaneously transmit the control signals to the graphics processor, the control signals comprise a galvanometer driving signal, a laser scanning signal, and a camera exposure signal;
   the sensor is configured to collect an actual signal waveform capable of reflecting an actual state of the galvanometer, output a noise-reduced waveform and transmit the noise-reduced waveform to the graphics processor; and
   the graphics processor is configured to perform detection comparison on the actual signal waveform and the galvanometer driving signal for the galvanometer in the control signals, and transmit a result of the detection comparison to the signal generator to adjust the laser scanning signal and the camera exposure signal.

8. The modulation system according to claim 7, wherein said performing detection comparison on the actual signal waveform and the galvanometer driving signal for the galvanometer in the control signals comprises:
   performing a waveform comparison detection on the noise-reduced waveform and a corresponding control waveform corresponding to the galvanometer driving signal to obtain a waveform deviation as the result of the detection comparison.

9. The modulation system according to claim 8, wherein the waveform deviation comprises a phase deviation.

10. The modulation system according to claim 9, wherein the noise-reduced waveform reflects an actual phase in time of oscillation of a lens of the galvanometer, the control waveform reflects a theoretical phase in time of the oscillation of the lens of the galvanometer, and a time gap required for the lens of the galvanometer to deflect from the actual phase to the theoretical phase is determined based on the phase deviation; and said adjusting the laser scanning signal and the camera exposure signal comprises:
   transmitting the galvanometer driving signal at a first moment, and transmitting the laser scanning signal for the laser emitter and the camera exposure signal for the industrial camera within the control signals at a second moment, wherein the first moment differs from the second moment by the time gap.

11. The modulation system according to claim 9, wherein the waveform deviation further comprises a distinct waveform segment of the noise-reduced waveform, the distinct waveform segment being different from the control waveform in terms of waveform smoothness; and said adjusting the laser scanning signal and the camera exposure signal comprises: determining a time interval required for the noise-reduced waveform to pass through the distinct waveform segment, and adjusting, based on the phase deviation and the time interval, a moment at which the laser scanning signal and the camera exposure signal are transmitted.

12. The modulation system according to claim 8, wherein said adjusting the laser scanning signal and the camera exposure signal comprises:
   determining a distinct waveform segment, the waveform deviation comprising the distinct waveform segment;
   determining, based on the distinct waveform segment, a wave value corresponding to a moment at which a waveform smoothness of the noise-reduced waveform is consistent with a waveform smoothness of the control waveform; and
   determining a transmission enabling signal based on the wave value, wherein the transmission enabling signal controls transmission of a-the laser scanning signal for the laser emitter and the camera exposure signal for the industrial camera within the control signals.

13. The modulation system according to claim 8, wherein the actual signal waveform is any one of a voltage waveform, a current waveform, a deflection angle waveform, or a reference point displacement waveform of the galvanometer; and the control waveform and the actual signal waveform are of a same type.

* * * * *